(12) United States Patent
Chung et al.

(10) Patent No.: US 8,107,268 B2
(45) Date of Patent: Jan. 31, 2012

(54) PASSIVE LOSSLESS SNUBBER CELL FOR A POWER CONVERTER

(75) Inventors: Shu Hung Chung, Hong Kong (HK); Tin Ho Li, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 357 days.

(21) Appl. No.: 12/556,450

(22) Filed: Sep. 9, 2009

(65) Prior Publication Data

US 2011/0057639 A1 Mar. 10, 2011

(51) Int. Cl.
H02H 7/122 (2006.01)

(52) U.S. Cl. .................. 363/56.12; 363/21.02; 323/222; 323/272

(58) Field of Classification Search ............... 363/16–20, 363/21.02, 37, 44, 52, 53, 56.11, 57, 65, 363/97, 98, 126, 135; 323/222, 224, 225, 323/235, 272, 351, 282–285; 327/427, 440
See application file for complete search history.

(56) References Cited

U.S. PATENT DOCUMENTS

| | | | | |
|---|---|---|---|---|
| 5,260,607 A | * | 11/1993 | Kinbara | 327/427 |
| 5,532,919 A | * | 7/1996 | Gegner | 363/124 |
| 5,736,842 A | * | 4/1998 | Jovanovic | 323/222 |
| 5,841,268 A | * | 11/1998 | Mednik | 323/222 |
| 6,052,294 A | * | 4/2000 | Jacobs et al. | 363/53 |
| 6,169,671 B1 | * | 1/2001 | Mao | 363/53 |

OTHER PUBLICATIONS

Ferranti, M., et al., "Solar Energy Supply System for Induction Motors and Various Loads", *Proceedings, 10th International Telecommunication Energy Conference (INTELEC)*, vol. 2, (Oct. 1989), pp. 15.7/1-15.7/7.

Smith, Jr., K. M., et al., "Engineering Design of Lossless Passive Soft Switching Methods for PWM Converters—Part I: With Minimum Voltage Stress Circuit Cells", *IEEE Transactions on Power Electronics*, 16(3), (May 2001), 336-344.

Smith, Jr., K. M., et al., "Engineering Design of Lossless for PWM Converters—Part II. With Non-Minimum Voltage Stress Circuit Cells", *IEEE Transactions on Power Electronics*, 17(6), (Nov. 2002), 864-873.

(Continued)

*Primary Examiner* — Rajnikant Patel
(74) *Attorney, Agent, or Firm* — Schwegman, Lundberg & Woessner, P.A.

(57) ABSTRACT

A passive lossless snubber cell for a switched-mode power converter comprises an energy absorbing circuit and an energy resetting circuit coupled to said energy absorbing circuit. The energy absorbing circuit is arranged to release energy stored in a snubber capacitor of the energy absorbing circuit to a storage capacitor of the energy resetting circuit through a resonant pathway of the snubber cell in response to a first switching action of a power converter transistor switch. The energy resetting circuit is arranged to release the energy stored therein to a part of a circuit of the power converter in response to a second switching action of the power converter transistor switch, the second switching action being a successive action to the first switching action. The passive lossless snubber cell has several advantages over existing snubbering techniques. First, it provides zero-current-switching (ZCS) and zero-voltage-switching (ZVS) conditions for turning on and off, respectively, the switch over a wide load range. Second, it does not introduce extra voltage stress on the switch. Third, by taking the ripple current through the switch into account, the peak switch current during the snubber resonance period is designed to be less than the designed switch current without the snubber. Hence, the proposed snubber does not introduce extra current stress on the switch.

16 Claims, 30 Drawing Sheets

OTHER PUBLICATIONS

Smith, Jr., K. M., et al., "Lossless Passive Soft-Swithing Methods for Inverters and Amplifiers", *IEEE Transactions on Power Electronics*, 15(1), (Jan. 2000), 164-173.

Smith, Jr., K. M., et al., "Properties and Synthesis of Passive Lossless Soft-Switching PWM Converters", *IEEE Transactiions on Power Electronics*, 14(5), (Sep. 1999), 890-899.

* cited by examiner

| DIODES | TIME DURATION | | | | | | | | |
|---|---|---|---|---|---|---|---|---|---|
| | $t_0 - t_1$ | $t_1 - t_2$ | $t_2 - t_3$ | $t_3 - t_4$ | $t_4 - t_5$ | $t_5 - t_6$ | $t_6 - t_7$ | $t_7 - t_8$ | $t_8 - t_9$ |
| $D_1$ | | | ● | | ● | ● | | | |
| $D_2$ | | | | | | | | ● | |
| $D_3$ | | ● | ● | | | | | ● | |
| $D_4$ | | | | | | ● | ● | | |

NOTE: ● DIODE IS CONDUCTING

PASSIVE LOSSLESS SNUBBER CELL FOR A POWER CONVERTER

FIELD OF THE INVENTION

The invention relates to a passive lossless snubber cell with minimum stress and wide soft-switching range. More specifically, the invention relates to such a snubber cell for a power converter and, more particularly, for a switched-mode power supply of the type comprising at least a transistor switch, a diode, a capacitor and an inductor.

BACKGROUND OF THE INVENTION

Power switches in traditional pulsewidth modulated (PWM) converters such as switched-mode power supplies are operated in hard switching conditions. Switched-mode power supplies are often referred to as converters, power converters, switched converters, switched power converters, and switch-mode power converters and, as such, any reference to any one of them in the following shall be taken to be a reference to all of them. During the turn-on and turn-off switching processes, the devices have to withstand high voltage and current simultaneously, resulting in high switching losses and stresses. The classical method of reducing switching losses, dv/dt, di/dt, and stresses is to use dissipative snubbers. However, dissipative snubbers produce undesirable power losses, thus limiting their application to low power or low frequency converters.

In order to overcome switching loss and enable high-frequency operation, several active snubbers that utilize soft-switching techniques have been proposed. These are operated during the short switching time to perform zero-voltage-switching (ZVS) or zero-current-switching (ZCS). The main goal of the active snubbers is to maintain advantages provided by PWM and resonant converters. The former ones have fixed-frequency operation with square current and voltage while the latter ones have low switching losses. However, such merits are often offset by requiring additional switch and control circuitry, limited operating range, and high voltage/current stresses on the switches. Due to the presence of an additional switch, the switching losses will also be increased.

Passive snubbers remain attractive alternatives as they are generally easy to design and require fewer components. A typical passive snubber consists of two parts: a turn-on snubber and a turn-off snubber. The turn-on snubber limits the rate of rise of the current through the switch and allows the voltage across it to drop before its current starts increasing. The turn-off snubber limits the rate of rise of the voltage across the switch after it is turned off. The switch is made to turn on with near ZCS and turn off with near ZVS, resulting in reduced switching losses.

A snubber has to perform two processes, namely energy absorbing and energy resetting/recirculating. The total durations taken for these two processes determine the minimum and maximum duty time of the switches. As shown in FIG. 1, the simplest form of the energy absorbing circuit for the turn-on snubber is an inductor ($L_s$) in series with the switching device (S) while the one for the turn-off snubber is a capacitor ($C_s$) in parallel with the switching device. The diode $D_1$ provides polarized charging of $C_s$ when the switching device is turned off, and avoids direct discharging of $C_s$ when the switching device is turned on. Most snubber structures therefore distinguish themselves from others by the difference of their energy resetting circuits.

The simplest form of the energy resetting circuit is based on using a resistor as a dissipative energy resetting circuit, but the energy stored in the inductor and capacitor is dissipated as heat in the resistor. To alleviate energy-inefficiency problems associated with dissipative snubbers, various passive lossless snubbers have been proposed. The concept of such passive lossless snubbers is to reset the energy absorbing circuits by releasing or re-circulating the energy stored to an energy tank, such as an inductor, a capacitor, supply and/or load.

A straightforward approach to resetting the snubber is to use a switching converter, such as a forward or flyback converter, to re-circulate the energy stored in the snubber. The switching action of the main switch is made common to both the main power conversion and snubber energy conversion processes. However, the transformer coupling effect in such converters introduces additional voltage stress across the switch and the leakage inductance of the transformer or coupled inductors also generate undesirable voltage spikes.

Another approach to snubbering is based on using resonant circuits with passive reactive elements and diodes only. The structures of such circuits are simple and can be incorporated readily into existing converters. The absorbed energy is transferred to the source or load or another selected part of the circuit containing the snubber cell through several LC resonant paths created by the main switch and the resonant circuits' diodes.

A typical such snubber cell is described in a publication by M. Ferranti, P. Ferraris, A. Fratta, and F. Profumo et al entitled "Solar energy supply system for induction motors and various loads," published in Proc. 10$^{th}$ International Telecommunication Energy Conference (INTELEC), vol. 2, pp. 15.7/1-15.7/7, October 1989. The concept of operation illustrated by the snubber cell of this publication is described in connection with a boost converter. The energy stored in the snubber inductor is firstly released to the snubber capacitor after the switch is switched to off. When the switch is switched to on, the stored energy is released to a storage capacitor and then to the load through resonant paths formed by the snubber cell diodes, snubber inductor, snubber capacitor, and the storage capacitor. Some improved circuits with saturable inductors added for reducing reverse recovery current of the main diode have been proposed. However, the voltage generated across the saturable inductor causes extra voltage stress on the switch and thus voltage clamping devices, like lossy zener diodes, have to be added.

An approach to investigating the properties and synthesis of the generalized form of the above category of snubbers has been addressed by a series of publications by K. Smith and K. Smedley. The publications are entitled "Properties and synthesis of passive lossless soft-switching PWM converter," IEEE Trans. Power Electron., vol. 14, no. 5, pp. 890-899, September 1999, "Lossless passive soft-switching methods for inverters and amplifiers," IEEE Trans. Power Electron., vol. 1, no. 1, pp. 164-173, January 2000, "Engineering design of lossless passive soft switching methods for PWM converters—Part I. With minimum voltage stress circuit cells," IEEE Trans. Power Electron., vol. 16, no. 3, pp. 336-344, May 2001, and "Engineering design of lossless passive soft switching methods for PWM converters—Part II. With non-minimum voltage stress circuit cells," IEEE Trans. Power Electron., vol. 17, no. 6, pp. 864-873, November 2002. In these publications, different sets of minimum voltage stress (MVS) and non-minimum voltage stress (NMVS) snubber circuit cells have been derived. The snubbers with MVS have been found to have narrower soft-switching range than the ones with NMVS.

Although known snubber cells can help reduce switching losses, they typically exhibit at least two of the following limitations:

1) The voltage stress across the switch, particularly in snubbers with NMVS, is high because the variation of the voltage across the snubber capacitor during resonance will generate additional off-state stress on the switch.
2) Soft-switching cannot be ensured at heavy load because the snubber cannot be completely reset before the next energy absorbing process. For example, when the load current is high, the snubber inductor has to take a long time to completely discharge. The storage capacitor in the snubber resetting circuit will be discharging faster than that of the snubber inductor in the resetting process. Then, the switch will not be turned on with ZCS.
3) The current stress on the switch is high because the switch current includes the discharging current of the snubber capacitor and main current flow for energy conversion.

OBJECTS OF THE INVENTION

An object of the invention is to provide an improved snubber cell for a switched-mode power converter that mitigates or obviates to some degree one or more problems associated with known snubber cells.

Another object of the invention is to provide a passive resonant/lossless snubber cell for a switched-mode power converted that is arranged such that the energy reset/recirculation process is completed before a next energy absorbing process can commence.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect of the invention, there is provided a snubber cell for a switched-mode power converter, comprising: an energy absorbing circuit; an energy resetting circuit coupled to said energy absorbing circuit; wherein the energy absorbing circuit is arranged to release energy stored in a snubber capacitor of the energy absorbing circuit to a storage capacitor of the energy resetting circuit through a resonant pathway of the snubber cell in response to a first switching action of a power converter transistor switch and wherein the energy resetting circuit is arranged to release the energy stored therein to a part of a circuit of the power converter in response to a second switching action of the power converter transistor switch, said second switching action being successive to the first switching action.

Preferably, the energy resetting circuit is arranged to release the energy stored therein to a load of the power converter circuit.

Preferably, the storage capacitor of the energy absorbing circuit is arranged to have an energy storage capacity equal to or greater than the energy storage capacity of the snubber capacitor.

Preferably, the energy absorbing circuit is arranged to release energy stored in a snubber inductor to be stored in the snubber capacitor in response to said first switching action prior to the step of releasing said energy from the snubber capacitor to said storage capacitor.

Preferably, the energy resetting circuit is arranged to not commence discharging of the energy stored in the storage capacitor until the snubber inductor is completely discharged. Preferably also, the energy resetting circuit is arranged to not commence discharging of the energy stored in the storage capacitor until the snubber inductor is completely discharged by defining a minimum switch on time and a minimum switch off time for the power converter transistor switch. Preferably further, a saturable inductor is arranged in series with said snubber inductor to further delay a rise in current in the transistor switch when the switch is switcher to on.

Preferably, the energy absorbing circuit comprises a snubber inductor arranged in series with the transistor switch of the power converter, the snubber capacitor arranged in parallel with said transistor switch, and a first diode arranged between a node common to the snubber inductor and the transistor switch and a node of said snubber capacitor.

Preferably, the energy resetting circuit comprises a configuration of a second diode, a storage inductor, a third diode, the storage capacitor and a fourth diode, wherein the second and fourth diodes and the storage capacitor couple the energy resetting circuit to the energy absorbing circuit.

Preferably, the snubber cell has first, second and third nodes for connecting to a switched-mode power converter circuit, there being provided a snubber inductor between the first and third nodes, a first diode in series with the snubber capacitor between the third and second nodes, a second diode between the first node and a first common node located between the first diode and the snubber capacitor, the storage capacitor in series with a fourth diode between the first and second nodes, and a storage inductor in series with a third diode between said first common node and a second common node located between the storage capacitor and the fourth diode.

In a second main aspect of the invention, there is provided a switched-mode power converter having a snubber cell according to the first main aspect of the invention.

Preferably, the switch-mode power comprises one of: a buck converter, boost converter, a buck-boost converter, a Cuk converter, a SEPIC, a two-switch forward converter, and a two-switch flyback converter.

In a third main aspect of the invention, there is provided a method of operating a switched-mode power converter having an energy absorbing circuit and an energy resetting circuit coupled to said energy absorbing circuit, the method comprising: releasing energy stored in a snubber capacitor of the energy absorbing circuit to a storage capacitor of the energy resetting circuit through a resonant pathway of the snubber cell in response to a first switching action of a transistor switch of the power converter; and releasing the energy stored in the storage capacitor to a part of a circuit of the power converter in response to a second switching action of the power converter transistor switch, said second switching action being successive to the first switching action.

Preferably, the method comprises not commencing discharging of the energy stored in the storage capacitor until the snubber inductor is completely discharged. Preferably also, the method comprises not commencing discharging of the energy stored in the storage capacitor until the snubber inductor is completely discharged by maintaining the transistor switch on for a defined minimum switch on time and maintaining the switch off for a defined minimum switch off time.

Preferably, the method involves providing a saturable inductor in series with said snubber inductor to further delay a rise in current in the transistor switch when the switch is turned on.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
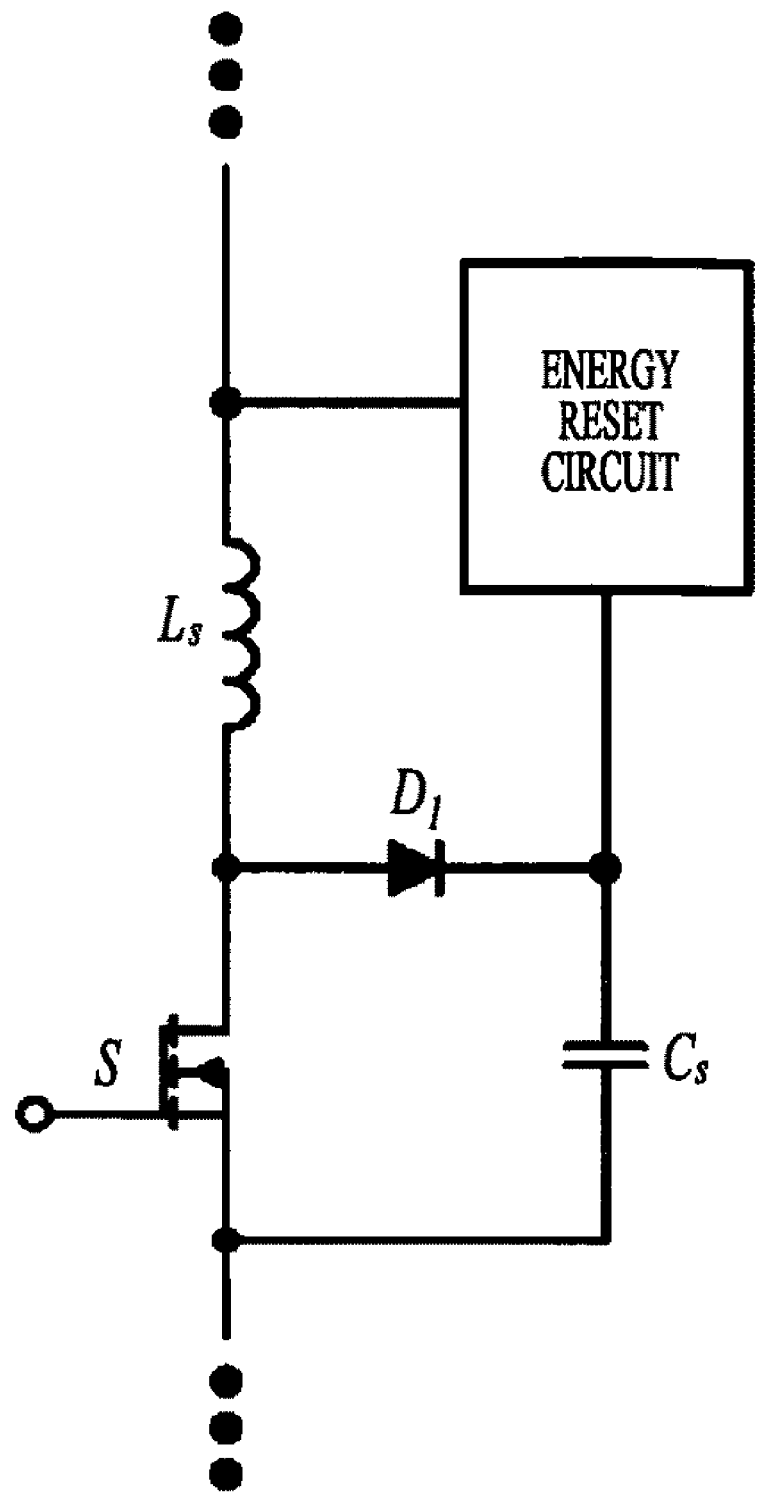
FIG. 1 is a schematic representation of a snubber cell.
Figure 2A:
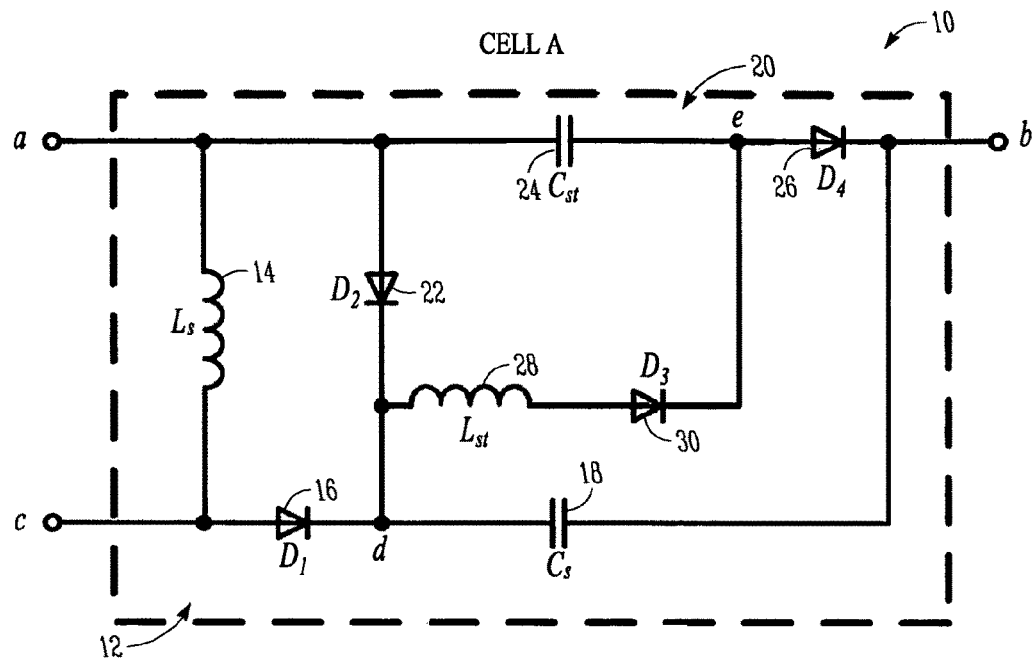
FIGS. 2a and 2b are schematic circuit diagrams of first and second embodiments (cell A and cell B) of a snubber cell according to the invention.
Figure 2B:
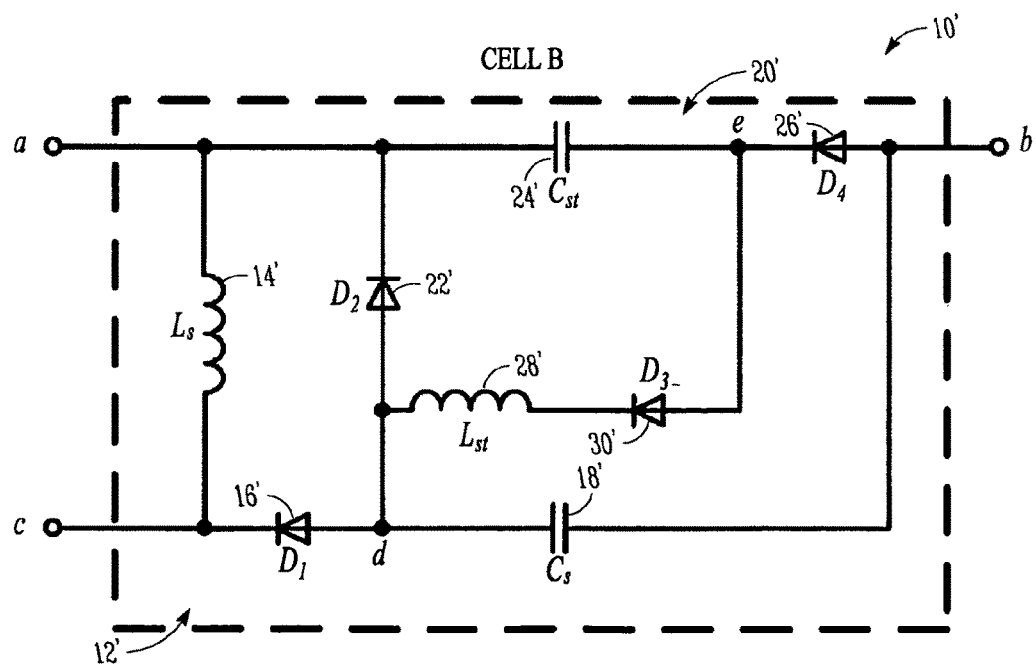

Referring to FIGS. 2a and 2b, shown are schematic circuit diagrams of first and second embodiments of a snubber cell 10, 10' for a switched-mode power converter according to the invention. As can be readily seen from a comparison of cell A (FIG. 2a) with cell B (FIG. 2b), the major difference between cells A and B is that of the direction of current flowing through node a and thus the polarity of some of the components within the circuit. Otherwise, cells A and B have the same general construction and configuration of components.

Referring to FIG. 2a, it can be seen that cell A 10 comprises an energy absorbing circuit 12 consisting of a snubber inductor $L_s$ 14 arranged between first and third terminals/nodes a and c of the snubber cell 10, and a first diode $D_1$ 16 and a snubber capacitor $C_s$ 18 arranged in series between the third terminal c and a second terminal b of said snubber cell 10. The snubber cell 10 also comprises an energy resetting circuit 20 coupled to said energy absorbing circuit 12. The energy resetting circuit 20 comprises a second diode $D_2$ 22 between the first node a and a first common node d located between the first diode $D_1$ 16 and the snubber capacitor $C_s$ 18, a storage capacitor $C_{st}$ 24 in series with a fourth diode $D_4$ 26 between the first and second nodes a and b, and a storage inductor $L_{st}$ 28 in series with a third diode $D_3$ 30 between said first common node d and a second common node e located between the storage capacitor $C_{st}$ 24 and the fourth diode $D_4$ 26. The snubber inductor $L_s$ 14 is arranged in series with the transistor switch (not shown) of the power converter (not shown) and the snubber capacitor $C_s$ 24 is arranged in parallel with said transistor switch. The first diode $D_1$ 16 is arranged between a node common to the snubber inductor $L_s$ and the transistor switch and a node of said snubber capacitor $C_s$.

The snubber cell (cell B) of FIG. 2b has generally the same configuration as that of cell A save for the reversal of some of the components as can be seen in the figure and like numerals have been used to denote like parts followed by a inverted comma.

Figure 3A:
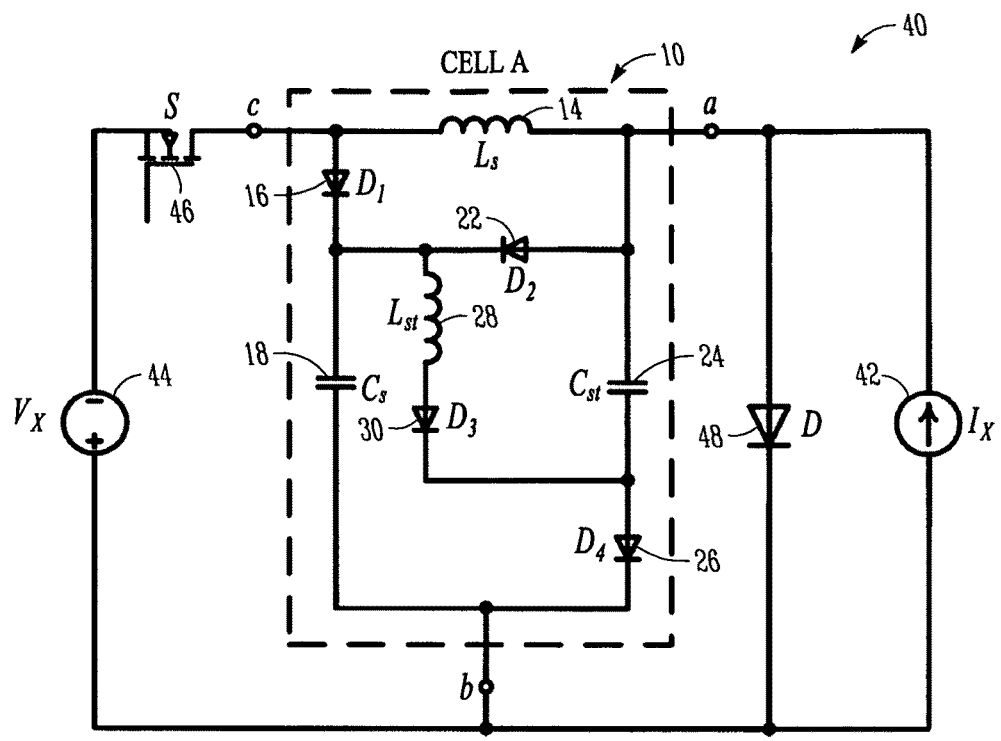
FIGS. 3a and 3b show how the snubber cell embodiments of the invention should be respectively connected to a switched current source and a switched voltage source.
Figure 3B:
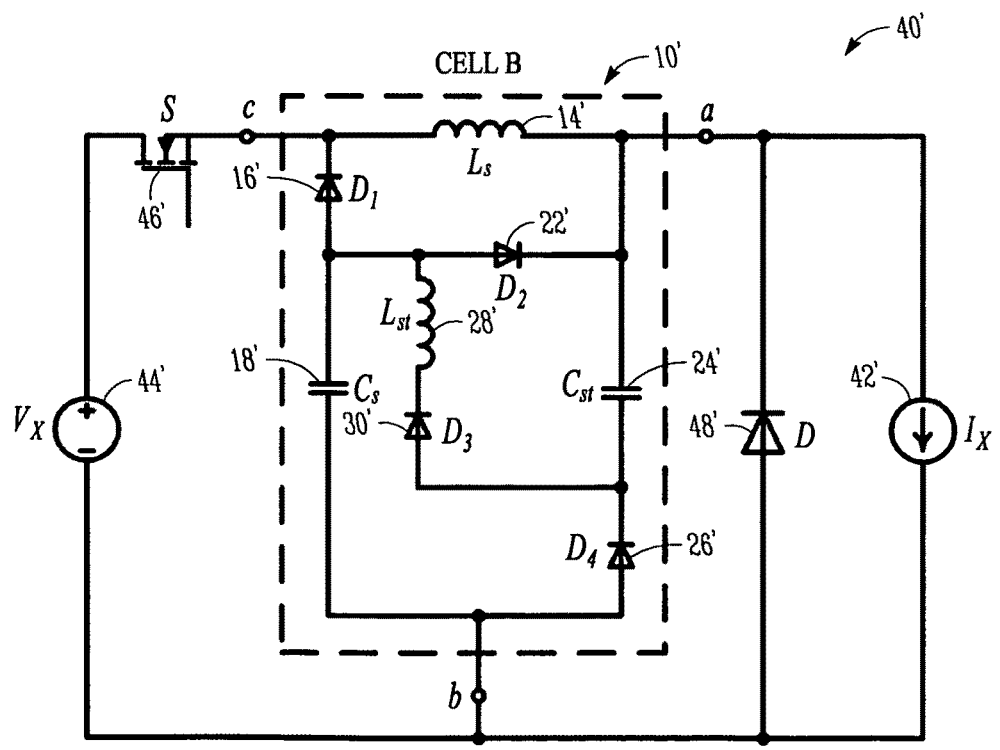

FIGS. 3a and 3b illustrate the snubber cells A and B of FIGS. 2a and 2b respectively incorporated into a power converter circuit 40, 40'. Like numerals to those employed in FIGS. 2a and 2b are used to denote like parts. The power converter circuit 40, 40' includes a switched current source 42, 42', a switched voltage source 44, 44', a transistor switch 46, 46' connected to the third node c of the snubber cell 10, 10' and a main diode 48, 48' connected between the first and third nodes a, b.

For each of cells A and B, the energy absorbing circuit is arranged to release energy stored in the snubber capacitor $C_s$ of the energy absorbing circuit to a storage capacitor $C_{st}$ of the energy resetting circuit through a resonant pathway of the snubber cell in response to a first switching action of a power converter transistor switch (not shown). The first switching action comprises switching on of said transistor switch. The resonant pathway comprises $C_s$-$L_s$-$C_{st}$-$D_3$-$L_{st}$. The energy resetting circuit is arranged to release the energy stored therein to a part of a circuit of the power converter in response to a second switching action of the power converter transistor switch. The second switching action comprises switching off of the transistor switch. The energy resetting circuit may be arranged to release the energy stored therein to a load or a supply of the power converter circuit or to any other suitable part of the circuit to thereby prevent loss of the re-circulated energy.

In the snubber cell, it is desirable that the storage capacitor $C_{st}$ has an energy storage capacity equal to or greater than the energy storage capacity of the snubber capacitor $C_s$.

The energy absorbing circuit is arranged to release energy stored in the snubber inductor $L_s$ to be stored in the snubber capacitor $C_s$ in response to said first switching action prior to the step of releasing said energy from the snubber capacitor $C_s$ to said storage capacitor $C_{st}$. In this way, the energy absorbed by the inductor is released to the snubber capacitor $C_s$ and then released to the storage capacitor $C_{st}$ for recirculation to another part of the power converter circuit. The snubber inductor $L_s$ thereby enables switching on of the power converter transistor switch with ZCS and the snubber capacitor $C_s$ enables switching off of the transistor switch with ZVS.

The energy resetting circuit is arranged to not commence discharging of the energy stored in the storage capacitor $C_{st}$ until the snubber inductor $L_s$ is completely discharged. It does this by maintaining the transistor switch on for a defined minimum switch on time and maintaining the transistor switch off for a defined a minimum switch off time.

The power converter transistor switch may comprise a MOSFET switching device or any other suitable type of transistor switch as will be familiar to one skilled in the art.

The snubber cells A and B do not introduce extra voltage stress on the power converter transistor switch over its operating range and the energy stored in the snubber inductor $L_s$ is ensured to be completely discharged before the storage capacitor $C_{st}$ starts to be discharged. By taking the ripple current through the switch into account, the peak switch current during the snubber resonance period is designed to be less than the designed switch current without the snubber. Thus, no extra current stress is introduced on the switch. This will be better understood from the following description of the operation of the snubber cell according to the invention.

Operating Principles of Snubber Cell B.

As already described, each of the snubber cells 10, 10' shown in FIGS. 2a and 2b has three nodes, namely nodes a, b, and c. To achieve the snubbering function, a switched current source of magnitude $I_x$ 42, 42' should be connected across nodes a and b, and a switched voltage source 44, 44' of magnitude $V_x$ should be connected across nodes b and c. The switch 46, 46' that requires snubbering action is connected to node c. FIGS. 3a and 3b illustrate the appropriate form of connection for cells A and B respectively. As already mentioned, the major difference between cells A and B is that of the direction of current flowing through node a. Cell A has the current going into node a while cell B has the current coming out of node a. Table I shows the values of $I_x$ and $V_x$ of different converters.

The concept of operation is to firstly transfer the snubber capacitor energy to a storage capacitor $C_{st}$ through a resonance process and then deliver it to the output and/or input of the power converter circuit in a successive switching action. As the snubber capacitor, $C_s$, and snubber inductor, $L_s$, are fully discharged within the switching period, the main switch can be turned on with zero current and turned off with zero voltage.

In the following description of the operation of the snubber cell, reference will be made to the operation of snubber cell B 10', but it will be understood by one skilled in the art that the operation of cell A 10 follows closely with that of cell B save for considerations relating to the direction of current flow and polarity of components.

Figure 4:
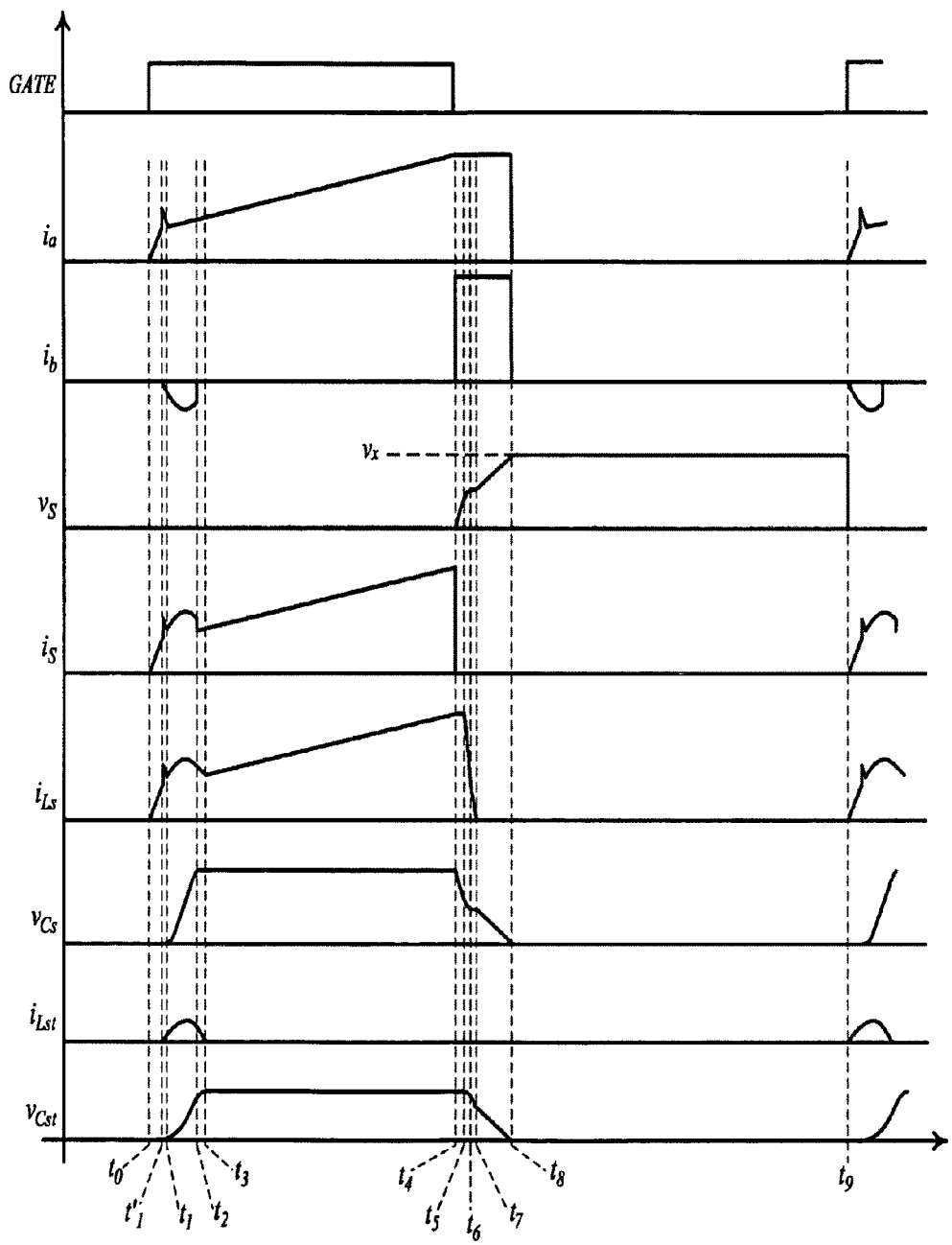
FIG. 4 illustrates the voltage and current waveforms in the operation of the snubber cell B according to the invention.
Figures 5, 6A:
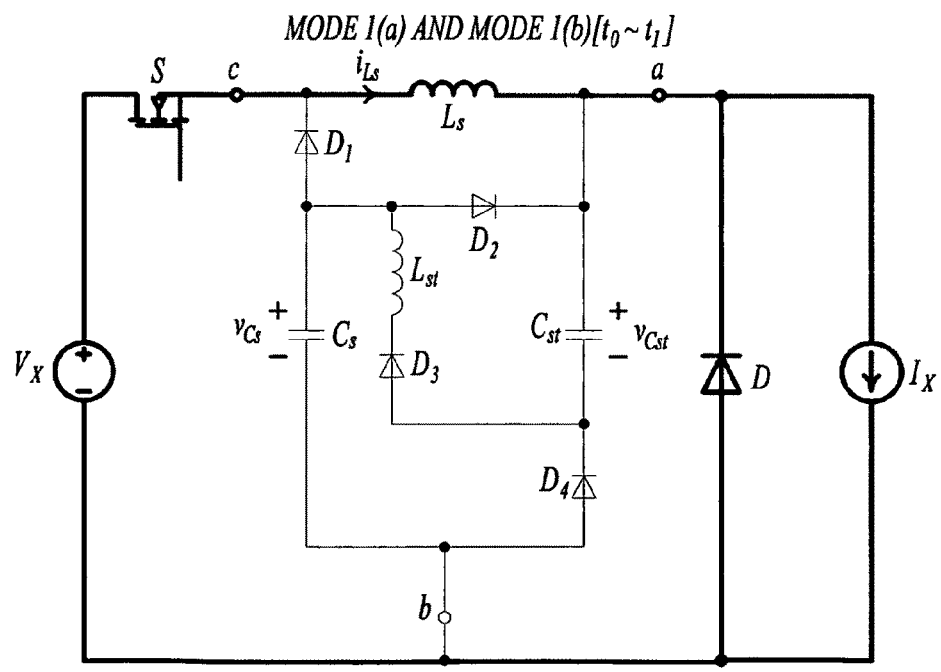
FIG. 5 illustrates the conducting states of the diodes in the operation of the snubber cell B according to the invention.
FIGS. 6a to 6i illustrate the modes of operation of the snubber cell B according to the invention.

FIG. 4 shows the key voltage and current waveforms for cell B, FIG. 5 shows the conducting states of the diodes for cell B and FIGS. 6a-i shows the modes of operation as will be explained below. For the sake of simplicity, several assumptions have been made in the analysis as follows:

1) The switch and diodes are ideal. They have zero on-state resistance, infinite off-state resistance and zero junction capacitance.
2) All energy storage components are free of loss without parasitic element.

Figure 6B:
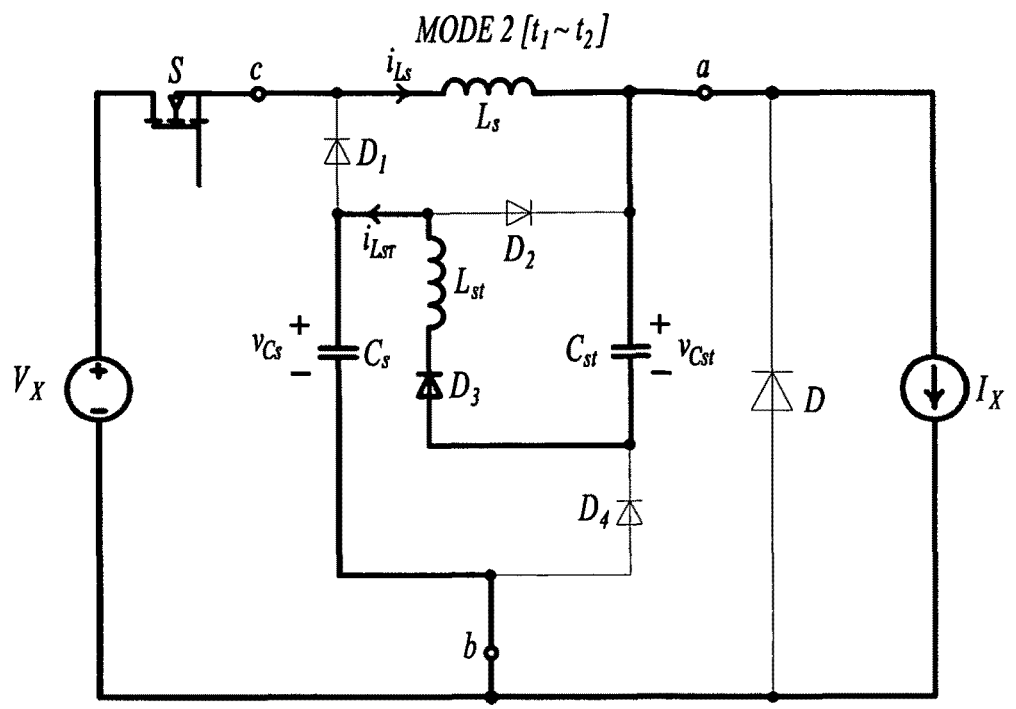
Figure 6C:
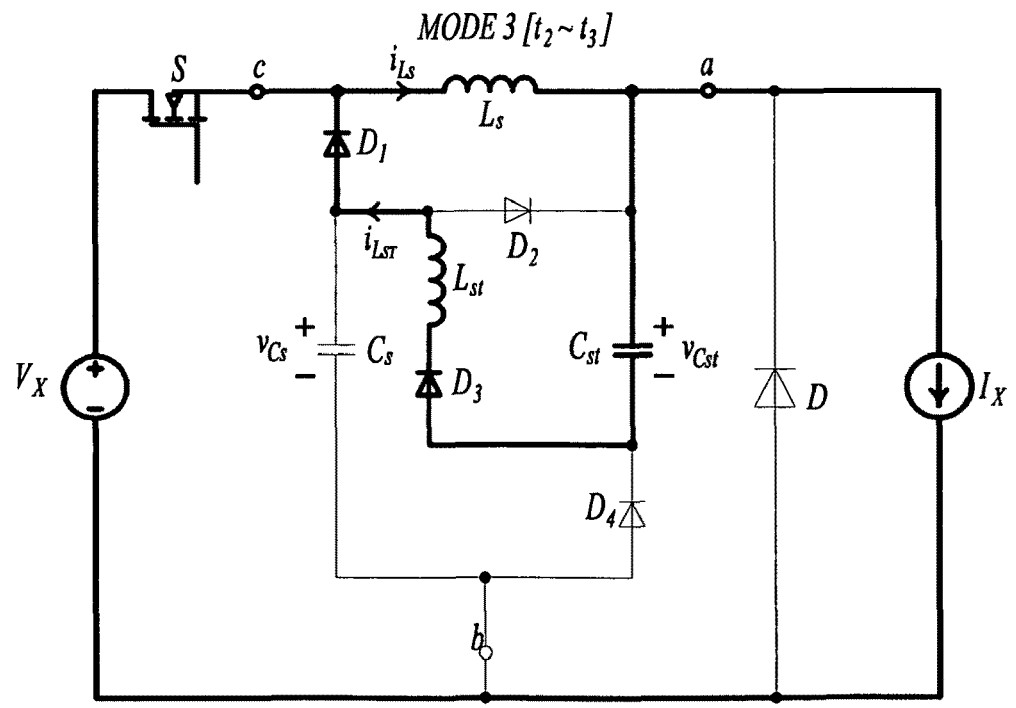
Figure 6D:
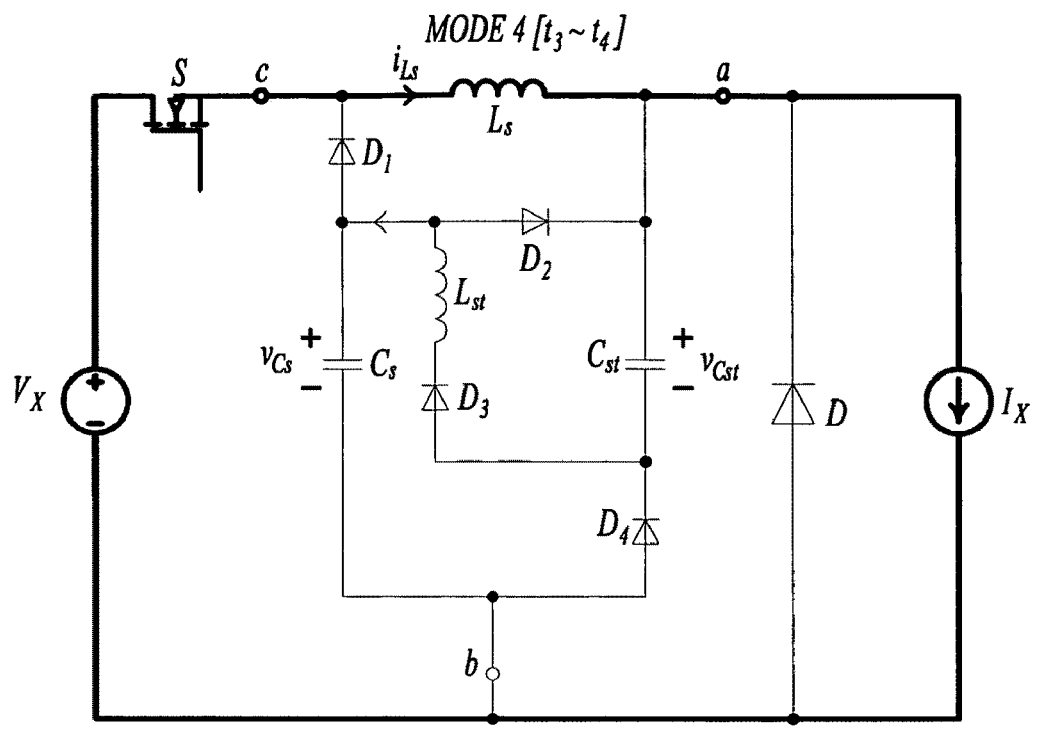
Figure 6E:
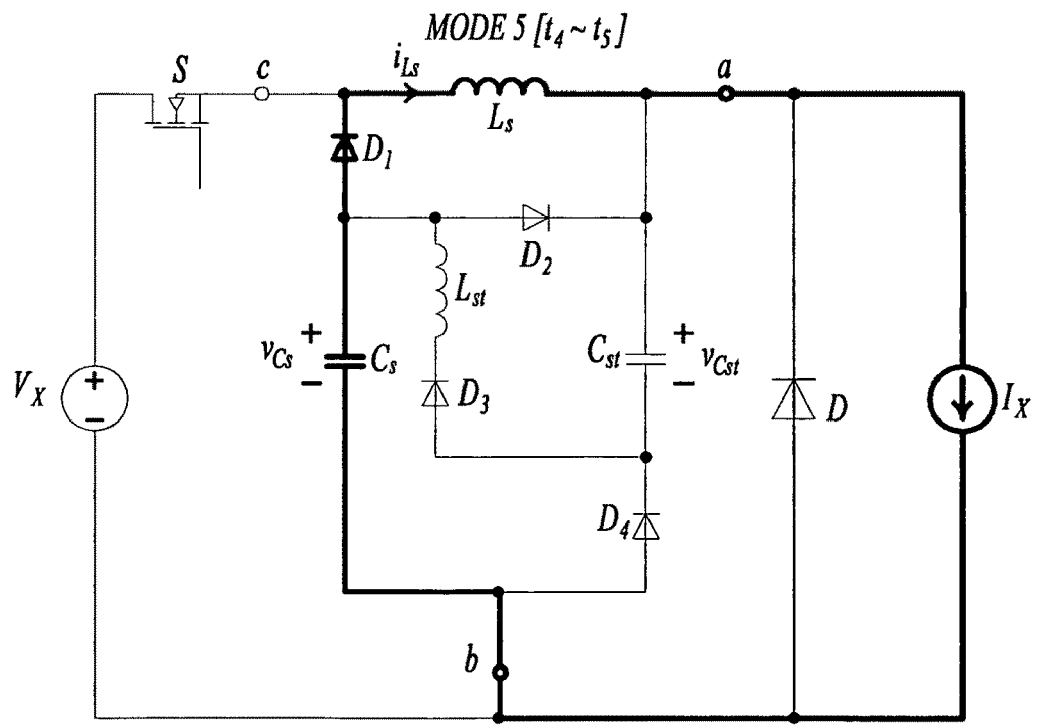
Figure 6F:
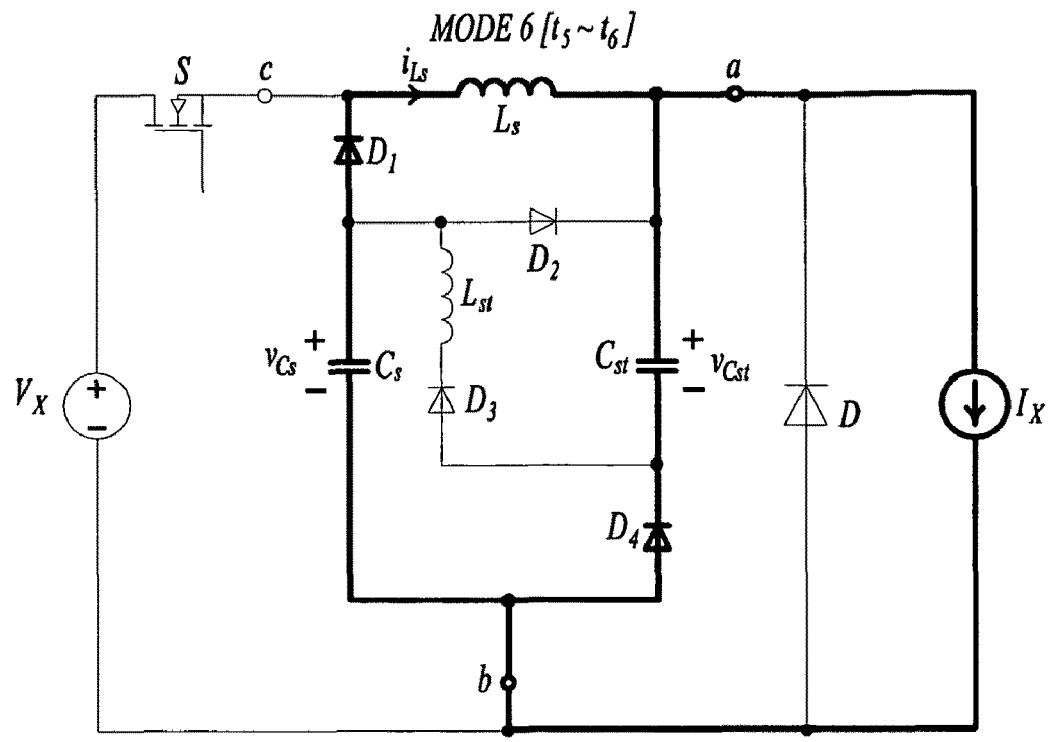
Figure 6G:
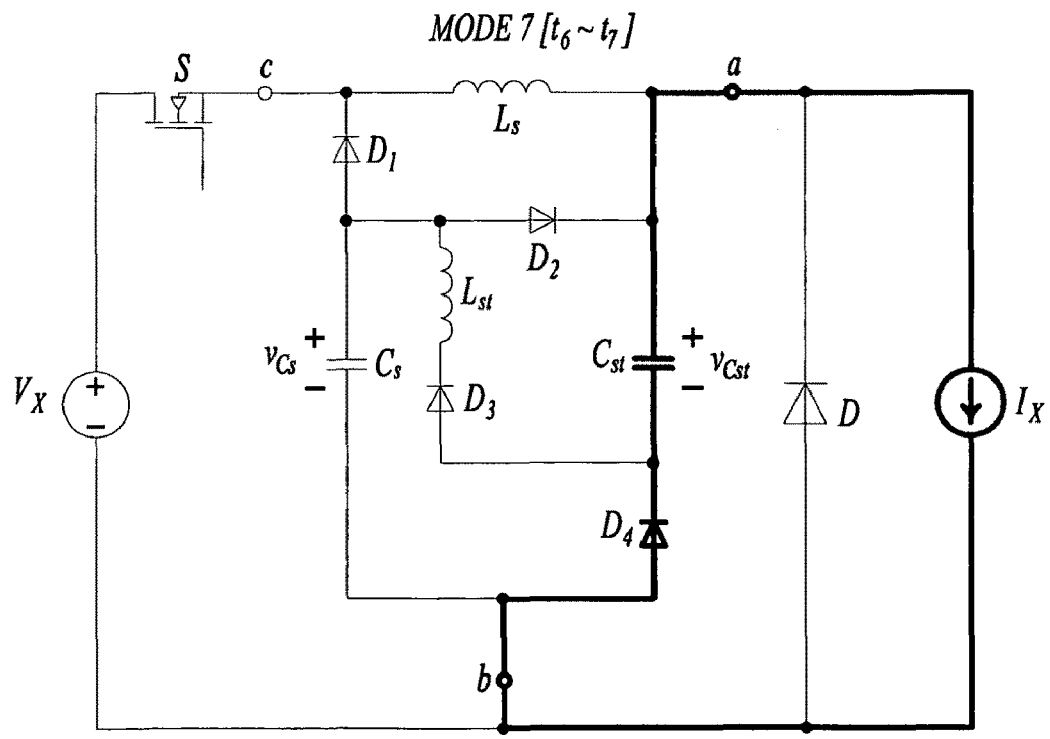
Figure 6H:
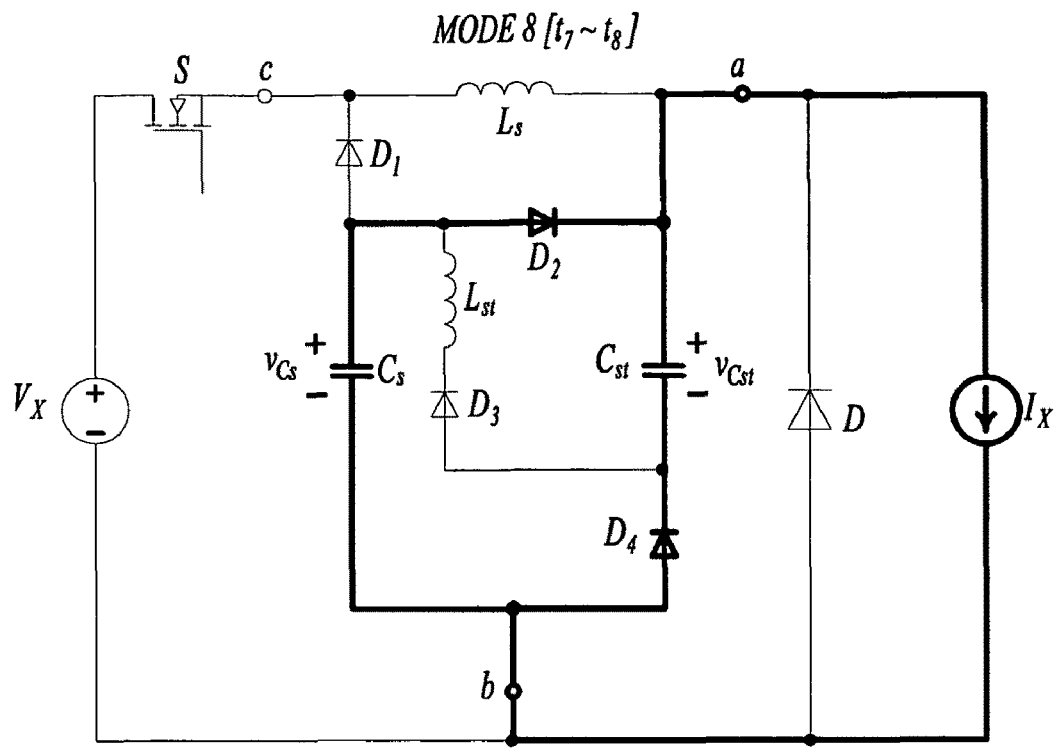
Figure 6I:
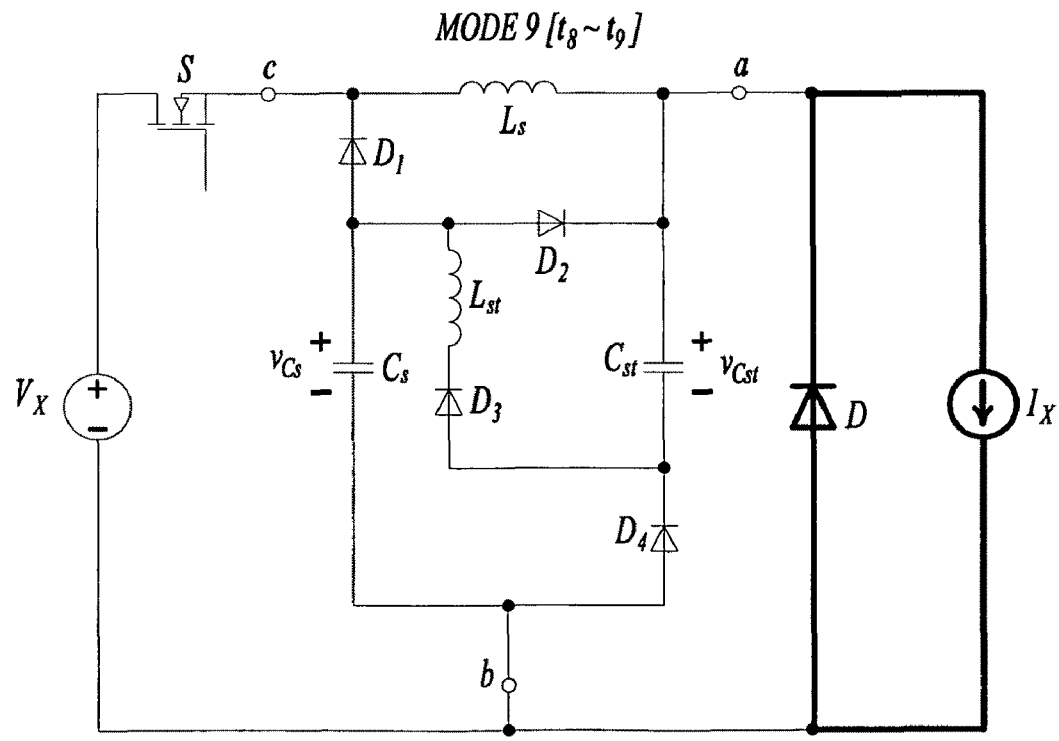

Before the start of a switching cycle (i.e., $t_0$), the main diode D of the power converter is in freewheeling stage as shown in FIG. 6(i). The voltages of $C_s$ and $C_{st}$ are zero, and the currents of $L_s$ and $L_{st}$ are all zero. The cyclical operation is described as follows.

Mode 1a [FIG. 6(a)] ($t_0 \leq t < t_1'$): The main switch is turned on with zero current, where $L_s$ and the leakage inductance of the transformer, $L_k$, in the isolated converter (not shown), limits the rate of rise of the switch current. This mode ends when the current at node c equals $I_x$. The value of $I_x$ of each converter is tabulated in Table I. Thus, $$L_s \frac{di_{Ls}}{dt} = V_x \quad (A1)$$

where $i_{Ls}$ is the current through $L_s$.

This mode ends when the switch current reaches $I_x$. Hence, $$t_1' - t_0 = \frac{L_s I_x}{V_x} \quad (A2)$$

Mode 1b [FIG. 6(a)] ($t_1' \leq t < t_1$): The output diode enters into the reverse recovery process. The duration of the process is approximated by the following equation $$\frac{1}{2}(t_1 - t_1')I_{rr} = \Delta Q_{rr} \quad (A3)$$

$$t_1 - t_1' = \frac{2\Delta Q_{rr}}{I_{rr}}$$

where $\Delta Q_{rr}$ is the reverse recovery charge of the diode, $I_{rr}$ is the peak reverse-recovery current, and S is snappiness factor.

The snappiness factor S of a diode is proportional to the time it takes the diode current to return to zero from its peak reverse-recovery current $I_{rr}$ to the time it takes the diode to pass from the zero current point to its peak reverse-recovery current $I_{rr}$. The snappiness factor describes "how soft" the diode is when it turns off. A soft recovery diode means that S>1 is comparatively long. Therefore, it cannot be used in a location where the switching frequency is high. A snappy diode means that S<1. Such a diode can be used in a high frequency switching location, but the reverse recovery related loss is relatively high.

Since $$L_s \frac{I_{rr}}{t_1 - t_1'}(1 + S) = V_x \quad (A4)$$

Equation (A3) can be expressed as $$I_{rr} = \sqrt{\frac{2\Delta Q_{rr} V_x}{L_s(1 + S)}} \quad (A5)$$

The peak current $\hat{I}_s$ flowing through the switch is $$\hat{I}_s = I_{in} + I_{rr} \quad (A6)$$

By using (A3) and (A5), the diode is completely off when $$t_1 - t_1' = \sqrt{\frac{2\Delta Q_{rr} L_s(1 + S)}{V_x}} \quad (A7)$$

Mode 2 [FIG. 6(b)] ($t_1 \leq t < t_2$): The energy stored in $C_s$ is transferred to $C_{st}$ through the resonance path $C_s$-$L_s$-$C_{st}$-$D_3$-$L_{st}$.

$$i_{Ls}(t) = I_x + \frac{V_x}{Z_{2a}}\sin\omega_{2a}(t - t_1) \quad (A8)$$

$$i_{Lst}(t) = i_{Ls}(t) - I_x = \frac{V_x}{Z_{2a}}\sin\omega_{2a}(t-t_1) \qquad (A9)$$

$$v_{Cs}(t) = V_x \frac{1}{1+x}[1-\cos\omega_{2a}(t-t_1)] \qquad (A10)$$

$$v_{Cst}(t) = V_x \frac{x}{1+x}[1-\cos\omega_{2a}(t-t_1)] \qquad (A11)$$

where, $$Z_{2a} = \sqrt{\frac{L_{eq}}{C_{eq}}}, \; \omega_{2a} = \frac{1}{\sqrt{L_{eq}C_{eq}}}, \; L_{eq} = L_s + L_{st}, \; C_{eq} = \frac{C_s C_{st}}{C_s + C_{st}},$$

and $$x = \frac{C_s}{C_{st}}$$

is the ratio between $C_s$ and $C_{st}$.

This mode ends when $v_{Cs}(t_2) = V_x$. Thus, by using (A12), $$\cos\omega_{2a}(t_2-t_1) = -x \qquad (A12)$$

By substituting (A12) into (A11), $$v_{Cst}(t_2) = xV_x \qquad (A13)$$

In order to ensure the existence of $t_2$ for charging $C_s$ completely, the value of x in (A12) should be less than or equal to one. Therefore, $$C_{st} \geq C_s \qquad (A14)$$

$$t_2 - t_1 = \frac{1}{\omega_{2a}}\left(\frac{\pi}{2} + \sin^{-1}x\right) \qquad (A15)$$

$$\sin\omega_{2a}(t_2-t_1) = \sqrt{1-x^2} \qquad (A16)$$

By substituting (A16) into (A8) and (A9), $$i_{Ls}(t_2) = I_x + \sqrt{\frac{C_s}{L_{eq}}}\sqrt{1-x}\,V_x \qquad (A17)$$

$$i_{Lst}(t_2) = \sqrt{\frac{C_s}{L_{eq}}}\sqrt{1-x}\,V_x \qquad (A18)$$

Mode 3 [FIG. 6(c)] ($t_2 < t < t_3$): $D_1$ conducts. The energy stored in $L_{st}$ is transferred to $C_{st}$ through the resonance path, $D_1$-$L_s$-$C_{st}$-$D_3$-$L_{st}$.

$$i_{Ls}(t) = I_x + V_x\sqrt{\frac{C_s}{L_{eq}}}\cos[\omega_{2b}(t-t_2)+\phi_{2b}] \qquad (A19)$$

$$i_{Lst}(t) = V_x\sqrt{\frac{C_s}{L_{eq}}}\cos[\omega_{2b}(t-t_2)+\phi_{2b}] \qquad (A20)$$

$$v_{Cs}(t) = V_x \qquad (A21)$$

$$v_{Cst}(t) = \sqrt{x}\,V_x\sin[\omega_{2b}(t-t_2)+\phi_{2b}] \qquad (A22)$$

where $$Z_{2b} = \sqrt{\frac{L_{eq}}{C_{st}}}, \; \omega_{2b} = \frac{1}{\sqrt{L_{eq}C_{st}}},$$

and $$\phi_{2b} = \tan^{-1}\sqrt{\frac{x}{1-x}}.$$

This mode ends when $L_{st}$ is fully discharged, i.e., $i_{Lst}(t_3) = 0$. Thus, by using (A20), $$t_3 - t_2 = \frac{1}{\omega_{2b}}\tan^{-1}\sqrt{\frac{1-x}{x}} \qquad (A23)$$

By substituting (A23) into (A19)-(A22), $$i_{Ls}(t_3) = I_x \qquad (A24)$$

$$i_{Lst}(t_3) = 0 \qquad (A25)$$

$$v_{Cs}(t_3) = V_x \qquad (A26)$$

$$v_{Cst}(t_3) = \sqrt{x}\,V_x \qquad (A27)$$

Mode 4 [FIG. 6(d)] ($t_3 < t < t_4$): The switch current equals $I_x$. This mode defines the duty cycle of the main switch. Equations (A24)-(A27) still hold in this mode. This mode ends when the main switch is switched off with zero voltage at $t_4$.

Mode 5 [FIG. 6(e)] ($t_4 < t < t_5$): The main switch is switched off with zero voltage, $C_s$ is discharged by $I_x$. Thus, $$i_{Ls}(t) = I_x \qquad (A28)$$

$$i_{Lst}(t) = 0 \qquad (A29)$$

$$v_{Cs}(t) = V_x - \frac{I_x}{C_s}(t-t_4) \qquad (A30)$$

$$v_{Cst}(t) = \sqrt{x}\,V_x \qquad (A31)$$

This mode ends at $t_5$ when $$v_{Cs}(t_5) = v_{Cst}(t_4) \qquad (A32)$$
$$= \sqrt{x}\,V_x$$

By using (A30), $$t_5 - t_4 = (1-\sqrt{x})\frac{C_s}{I_x}V_x \qquad (A33)$$

Mode 6 [FIG. 6(*f*)] ($t_5 < t < t_6$): $C_s$ continues to be discharged by $I_x$. $C_{st}$ starts discharging by $I_x$ through $D_4$.

$$i_{Ls}(t) = \frac{I_x}{1+x}[x + \cos\omega_5(t - t_5)] \quad (A34)$$

$$i_{Lst}(t) = 0 \quad (A35)$$

$$v_{Cs}(t) = \sqrt{x}\,V_x - \frac{I_x}{C_{st}(1+x)}(t - t_5) - \frac{I_x}{x\omega_5 C_{st}(1+x)}\sin\omega_5(t - t_5) \quad (A36)$$

$$v_{Cst}(t) = \sqrt{x}\,V_x - \frac{I_x}{C_{st}(1+x)}(t - t_5) + \frac{I_x}{\omega_5 C_{st}(1+x)}\sin\omega_5(t - t_5) \quad (A37)$$

where $$\omega_5 = \frac{1}{\sqrt{L_s C_{eq}}}.$$

This mode ends at $t_6$ when $i_{Ls}(t_6)=0$. By using (A34), $$t_6 - t_5 \cong \frac{1}{\omega_5}\left(\frac{\pi}{2} + \sin^{-1}x\right) \quad (A38)$$

$$i_{Lst}(t_6) = i_{Lst}(t_5) = 0 \quad (A39)$$

$$v_{Cs}(t_6) \cong \sqrt{x}\,V_x - \frac{I_x}{1+x}\sqrt{\frac{L_s}{C_{st}}}\sqrt{\frac{x}{1+x}}\left(\frac{\pi}{2} + \sin^{-1}x + \frac{\sqrt{1-x^2}}{x}\right) \quad (A40)$$

$$v_{Cst}(t_6) = \sqrt{x}\,V_x - \frac{I_x}{1+x}\sqrt{\frac{L_s}{C_{st}}}\sqrt{\frac{x}{1+x}}\left(\frac{\pi}{2} + \sin^{-1}x - \sqrt{1-x^2}\right) \quad (A41)$$

Mode 7 [FIG. 6(*g*)] ($t_6 < t < t_7$): $C_{st}$ is discharged to the load by $I_x$.

$$i_{Ls}(t) = 0 \quad (A42)$$

$$i_{Lst}(t) = 0 \quad (A43)$$

$$v_{Cs}(t) = v_{Cs}(t_6) \quad (A44)$$

$$v_{Cst}(t) = v_{Cst}(t_6) - \frac{I_x}{C_{st}}(t - t_6) \quad (A45)$$

This mode ends at $t_7$ when $$v_{Cst}(t_7) = v_{Cs}(t_6) \quad (A46)$$

By using (A44) and (A45), $$t_7 - t_6 = \sqrt{L_s C_{st}}\sqrt{\frac{1-x}{x}} \quad (A47)$$

$$v_{Cst}(t_7) = \sqrt{x}\,V_x - I_x\sqrt{\frac{L_s}{C_{st}}}\frac{1}{1+x}\sqrt{\frac{x}{1+x}}\left(\frac{\pi}{2} + \sin^{-1}x + \frac{\sqrt{1-x^2}}{x}\right) \quad (A48)$$

Mode 8 [FIG. 6(*h*)] ($t_7 < t < t_8$): $C_s$ is discharged by $I_x$ again through $D_2$. $C_{st}$ continues to be discharged by $I_x$ through $D_4$. This mode ends when both $C_s$ and $C_{st}$ are fully discharged.

$$i_{Ls}(t) = 0 \quad (A49)$$

$$i_{Lst}(t) = 0 \quad (A50)$$

$$v_{Cs}(t) = v_{Cs}(t_7) - \frac{I_x}{C_{st}(1+x)}(t - t_7) \quad (A51)$$

$$v_{Cst}(t) = v_{Cst}(t_7) - \frac{I_x}{C_{st}(1+x)}(t - t_7) \quad (A52)$$

This mode ends at $t_8$ when $v_{Cs}(t_8)$ and $v_{Cst}(t_8)=0$. By using (A48) and (A52), $$t_8 - t_7 = \sqrt{L_s C_s}\left[\frac{V_x}{I_x}\sqrt{\frac{C_s}{xL_s}}(1+x) - \frac{1}{\sqrt{1+x}}\left[\frac{\pi}{2} + \sin^{-1}x + \frac{\sqrt{1-x^2}}{x}\right]\right] \quad (53)$$

Mode 9 [FIG. 6(*i*)] ($t_8 < t < t_9$): D conducts and $I_x$ will supply to the load. This mode ends when the main switch is turned on again. This completes one switching cycle.

Based on FIG. 5, the minimum on time $t_{on,min}$ and minimum off time $t_{off,min}$ of the main switch (power converter transistor switch) are calculated as follows. $t_{on,min}$ is the minimum time required to transfer the energy stored in the snubber capacitor $C_s$ to the reset circuit while $t_{off,min}$ is the minimum time required to transfer the energy stored in the reset circuit to the other part of the converter circuit. $t_{on,min}$ is the total time taken from Mode 1 to Mode 3 (i.e., from $t_0$ to $t_3$) while the one of $t_{off,min}$ is the total time taken from Mode 5 to Mode 8 (i.e., from $t_4$ to $t_8$). $t_{on,min}$ is obtained by adding up the time durations given in (A2), (A15), and (A23), and $t_{off,min}$ is obtained by adding up the time durations given in (A33), (A38), (A47), and (A53). Thus, $$t_{on,min} = \frac{L_s I_x}{V_x} + \frac{1}{\omega_{2a}}\left(\frac{\pi}{2} + \sin^{-1}x\right) + \frac{1}{\omega_{2b}}\tan^{-1}\sqrt{\frac{1}{x} - 1} \quad \text{and} \quad (A54)$$

$$t_{off,min} = \frac{C_s V_x}{I_x}\left(1 + \frac{1}{\sqrt{x}}\right) \quad (A55)$$

Design Procedure of the Snubber Cell According to the Invention.

The values of the passive components for the snubber cell are designed as follows:

1. Design the Value of $L_s$

The value of $L_s$ is determined by considering the rate of rise of the switch current in Mode 1*b* when $I_x$ is maximum, $I_{x,max}$. Thus, $$L_s \leq \frac{t_{1b,d} V_x}{I_{x,max}} \quad (A56)$$

where $t_{1b,d}$ is the designed duration of Mode 1*b* and $I_{x,max}$ is the peak value of $I_x$. It should be noted that $L_s$ can be realized by the leakage inductance of the transformer in the isolated converters, such as flyback and forward converter.

2. Design the Values of $C_s$ and $C_{st}$ $C_s$ and $C_{st}$ are designed by the following iterative procedure. Firstly, $x \in [0, 1]$ is randomly selected. Secondly, in order to ensure that the switch voltage stress in Mode 5 is less than $V_x$. By substituting x into (40) and make $v_{Cs}$ less than $V_x$, it can be shown that $$C_s \geq L_s \frac{x}{1+x}\left(\frac{\hat{I}_{in}}{V_x(1+x)}\right)^2\left(\frac{\pi}{2}+\sin^{-1}x+\frac{\sqrt{1-x^2}}{x}\right)^2 \quad (A57)$$

The minimum value of $I_x$, $I_{x,min}$, that can ensure soft-switching, is calculated by substituting x into (A55) with the designed minimum off time $t_{off,min,d}$. Thus, $$I_{x,min} = \frac{C_s V_x}{t_{off,min,d}}\left(1+\frac{1}{\sqrt{x}}\right) \quad (A58)$$

The value of x is accepted if $I_{x,min}$ is below the designed minimum input current, for example, 5% of the peak input current with the converter powering rated load at minimum input voltage. Otherwise, another value of x is chosen and the above iterative process is repeated. With the chosen value of x, $C_{st}$ is calculated from the value of $C_s$ because $$C_{st} = \frac{C_s}{x}.$$

3. Design of $L_{st}$

The value of $L_{st}$ is determined by considering that the current stress on the main switch is not higher than the designed current ripple $\Delta I$ on the main switch. Thus, based on (9), $$L_{st} = \left(\frac{V_x}{\Delta I}\right)^2 \frac{C_s}{1+x} - L_s \quad (A59)$$

4. The value of $t_{on,min}$ is calculated by using (A54) and the values of $C_s$, $C_{st}$, $L_s$, and $L_{st}$ designed above and compared with the designed minimum duty time of the main switch $d_{min} T_s$. If the condition of $d_{min} T_s \geq t_{on,min}$ is satisfied, the above set of component values will be taken. Otherwise, new set of values will be chosen again.

An important advantage of the snubber cell according to the invention compared to known snubber cells and, in particular, the MVS and NMVS snubber cells hereinbefore mentioned, is that the values, or energy storing capacities, of the snubber inductor and the snubber capacitor are comparatively, or relatively, small compared to those in the known snubber cells. This makes the energy absorbed by them small and the time taken or required for resetting them to be comparatively short. Consequently, the snubber cell according to the invention has a much wider soft-switching range for the transistor switch of the power converter than known snubber cells.

Furthermore, the resonant current in the energy resetting process of the snubber cell according to the invention is limited by the added energy absorbing circuit inductor $L_{st}$. Thus, the value of the snubber inductor $L_s$ need only be small, comparatively speaking. For the known MVS snubber cell, the resonant current is limited by the snubber inductor $L_s$. Consequently, a larger value of snubber inductor $L_s$ is needed for the MVS snubber cell. For the known NMVS snubber cell, an added inductor is used to assist the resonance at a lower current, but its presence introduces extra voltage stress on the transistor switch.

Comparison of the Snubber Cell of the Invention with a Prior-Art Snubber

Figure 7:
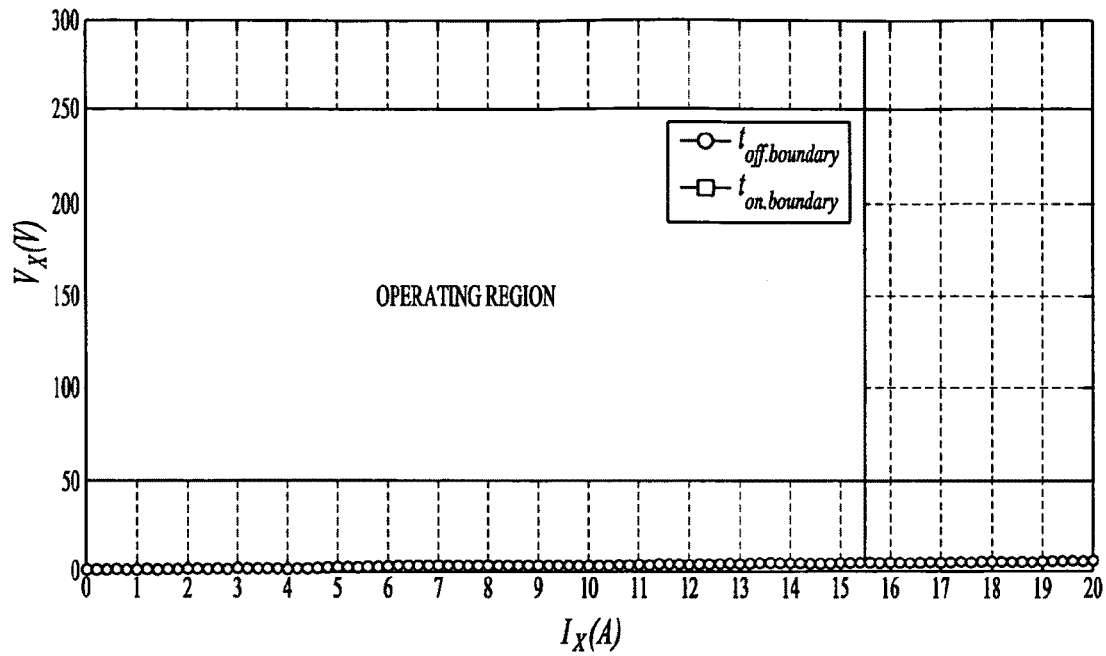
FIG. 7 shows the operating region of the snubber cell in a buck converter with 250V Vin and 48V Vout.
Figure 8:
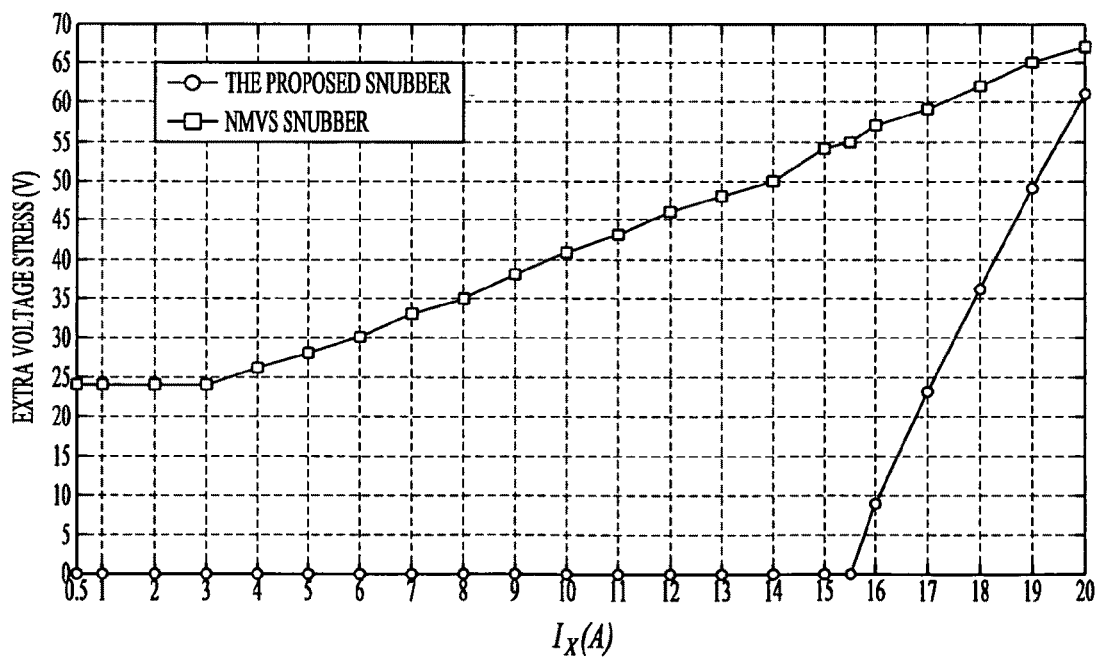
FIG. 8 illustrates the extra voltage stress on the power converter transistor switch versus the inductor current for the snubber cell of the invention.

The performance of the snubber cell according to the invention was compared with the NMVS snubber described in the publication "Engineering design of lossless passive soft switching methods for PWM converters—Part II. With non-minimum voltage stress circuit cells," IEEE Trans. Power Electron., vol. 17, no. 6, pp. 864-873, November 2002. The two snubbers were designed for a 750 W, 250V/48V buck converter as studied in the aforementioned publication. Table II shows the component values of the snubber according to the invention used for the comparison. According to Table I, the values of $I_x$ and $V_x$ were 15.5 A and 250V, respectively, at the rated load. FIG. 7 shows the operating region of the snubber cell according to the invention which provides soft-switching conditions to the main power converter switch. The region is formed by considering several boundaries. The first two boundaries relate to the minimum on and off times of the switch. They are $t_{on,boundary}$ and $t_{off,boundary}$. $t_{on,boundary}$ is the relationship between the values of $V_x$ and $I_x$ that can just satisfy the minimum on time in (A54). Similarly, $t_{off,boundary}$ is the relationship between the values of $V_x$ and $I_x$ that can just satisfy the minimum off time in (A55). The next two boundaries are the maximum and minimum values of $V_x$. The minimum value of $V_x$ is 48V, the rated output voltage. The next boundary is the maximum value of $I_x$. The final boundary is the vertical line intercepting $t_{off,boundary}$ and maximum $V_x$. The snubber cell is able to provide soft-switching conditions for $I_x$ varying between 0.28 A to 15.5 A. FIG. 8 shows the extra voltage stress on the main switch versus the inductor current. It can be seen that the extra voltage stress on the switch was kept to zero until the inductor current $I_L$ was higher than 15.5 A. Conversely, the known NMVS snubber gave an extra voltage stress from 25V to 55V. At the rated condition, the current stress on the main switch with the snubber of the present application was 18.11 A while the one with the NMVS snubber was 21.3 A. It can be seen that the proposed snubber gives lower voltage and current stress than the NMVS snubber on the main switch.

Experimental Verification of the Snubber Cell of the Invention.

A 200 W, 380V/24V two-switch flyback converter was built and evaluated. The switching frequency was 100 kHz and the power stage was operated in continuous conduction mode. Table III shows the component values of the snubber cell. The values were designed by following the design procedure given above. The leakage inductance of the flyback transformer was utilized as the snubber inductor. The snubber cell was designed so that the current peak in mode 2 was equal to the current ripple, 2.5 A, of the converter at rated load. Therefore, there was no extra current stress on the main switch.

Figure 9A:
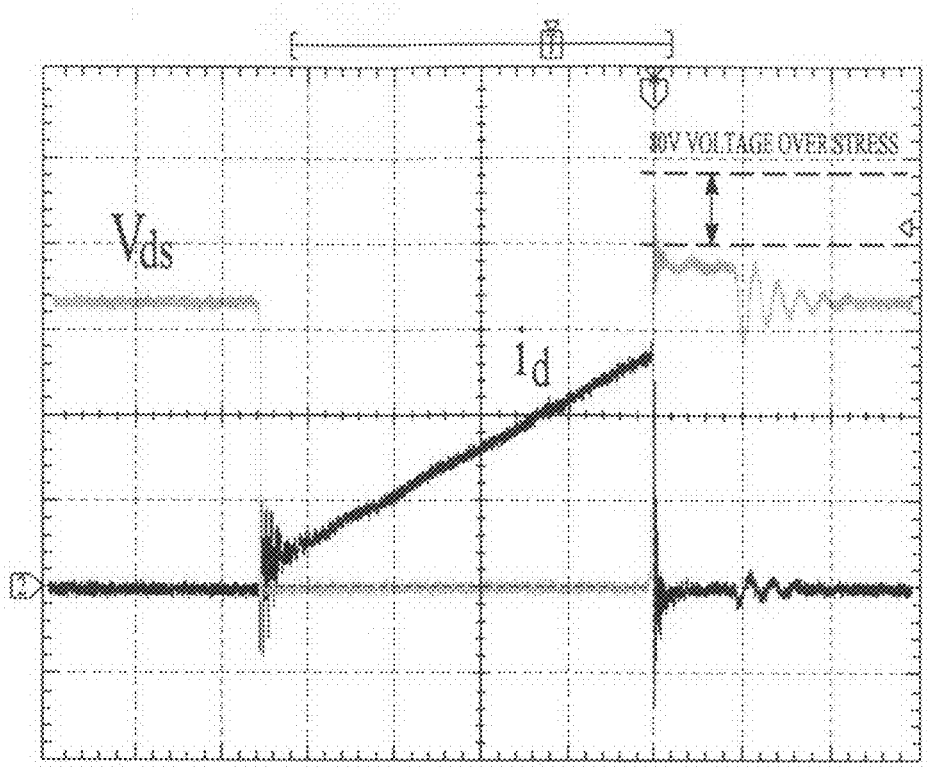
FIG. 9a illustrates switching waveforms of the power converter transistor switch without any snubber cell.
Figure 9B:
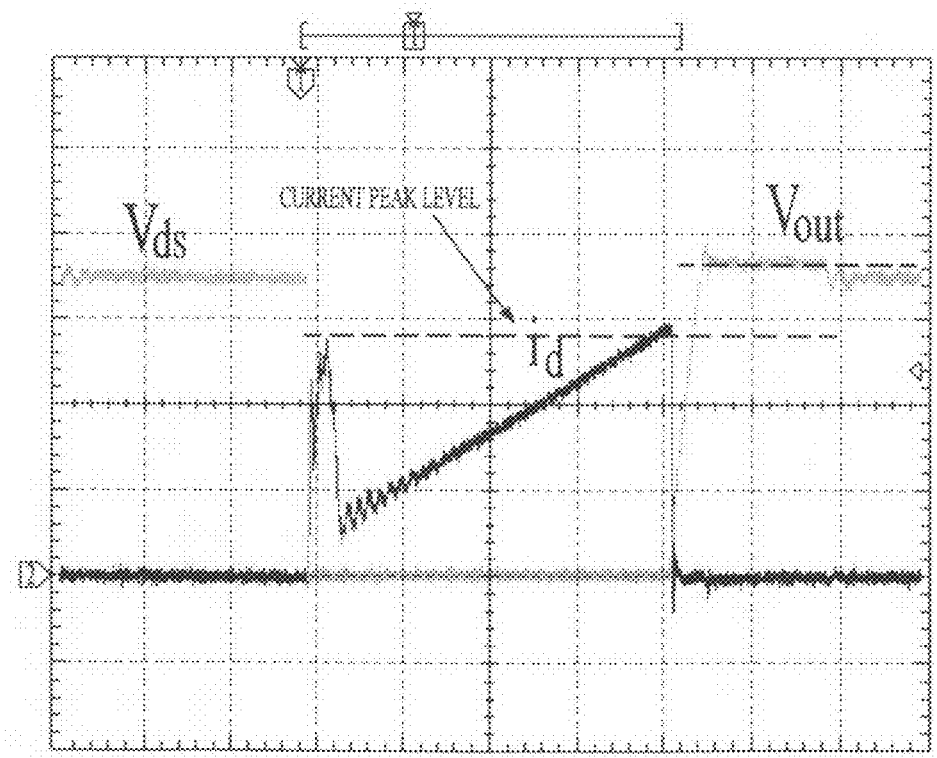
FIG. 9b illustrates switching waveforms of the power converter transistor switch with the snubber cell according to the invention.
Figure 10A:
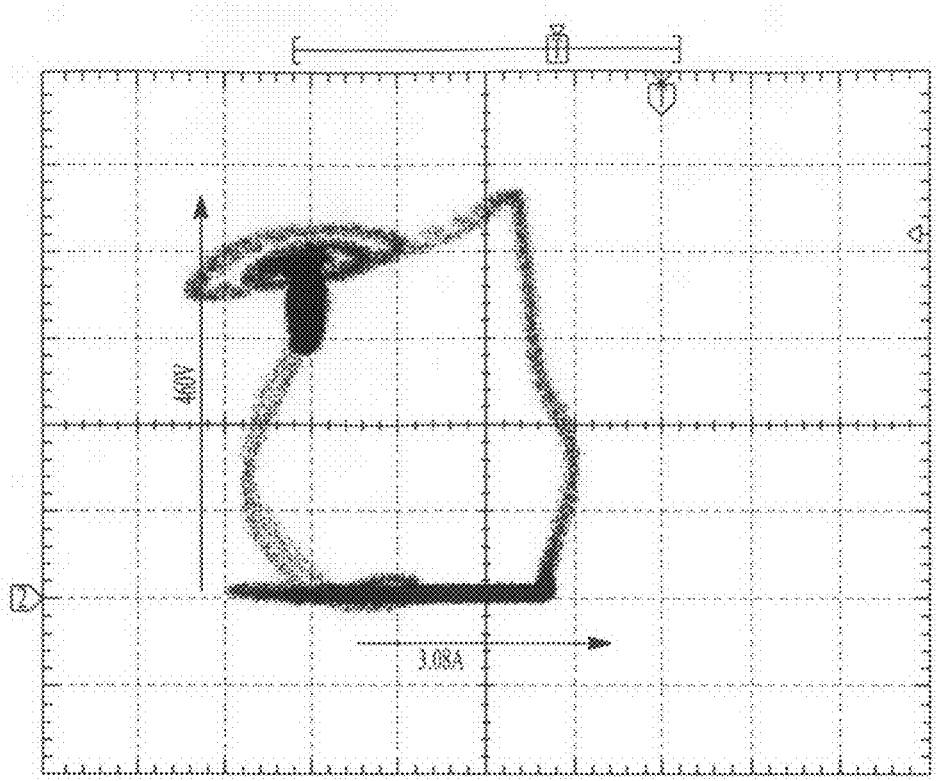
FIG. 10a illustrates switching trajectories of the power converter transistor switch without any snubber cell.
Figure 10B:
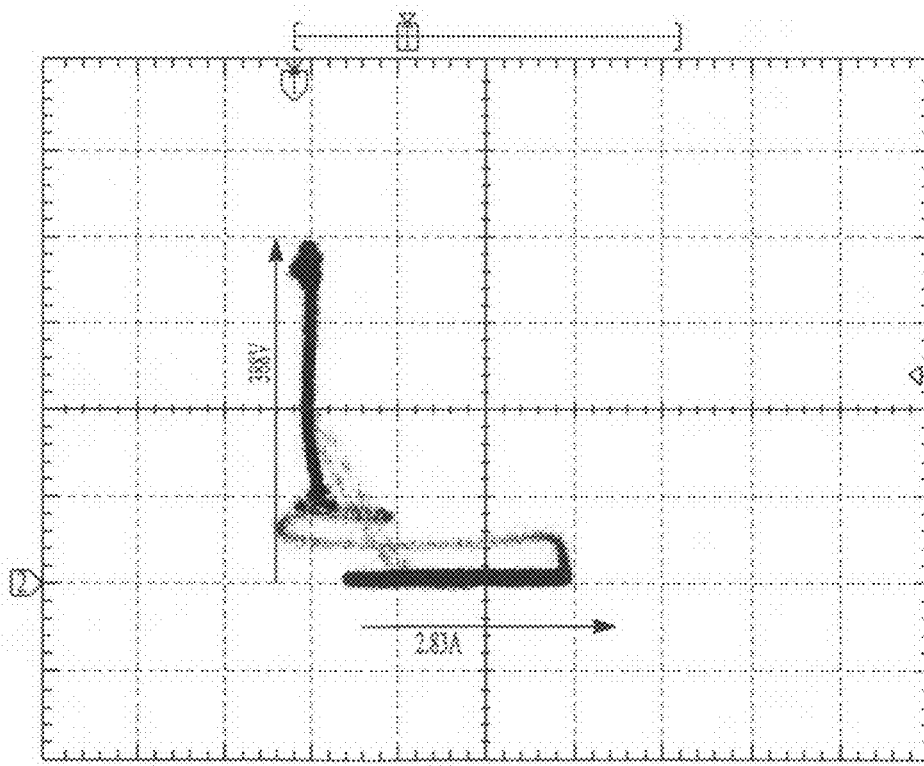
FIG. 10b illustrates switching trajectories of the power converter transistor switch with the snubber cell according to the invention.
Figure 11:
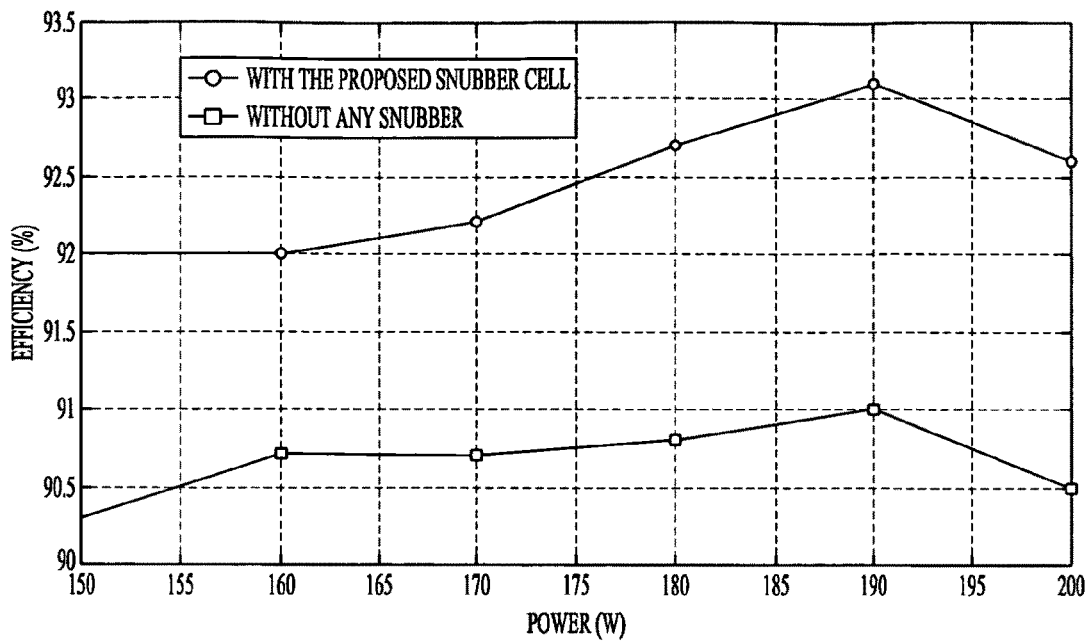
FIG. 11 illustrates power converter efficiency against load power for a power converter having a snubber cell according to the invention.
Figure 12:
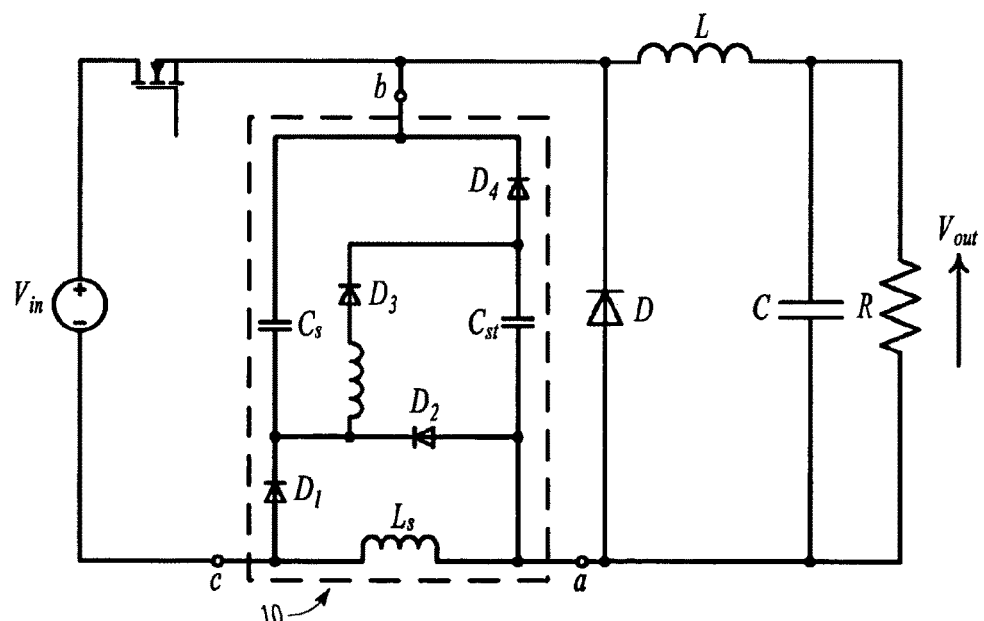
FIGS. 12 to 27 each show how a snubber cell or snubber cells according to the invention is/are integrated into different types of power converter circuit.
Figure 13:
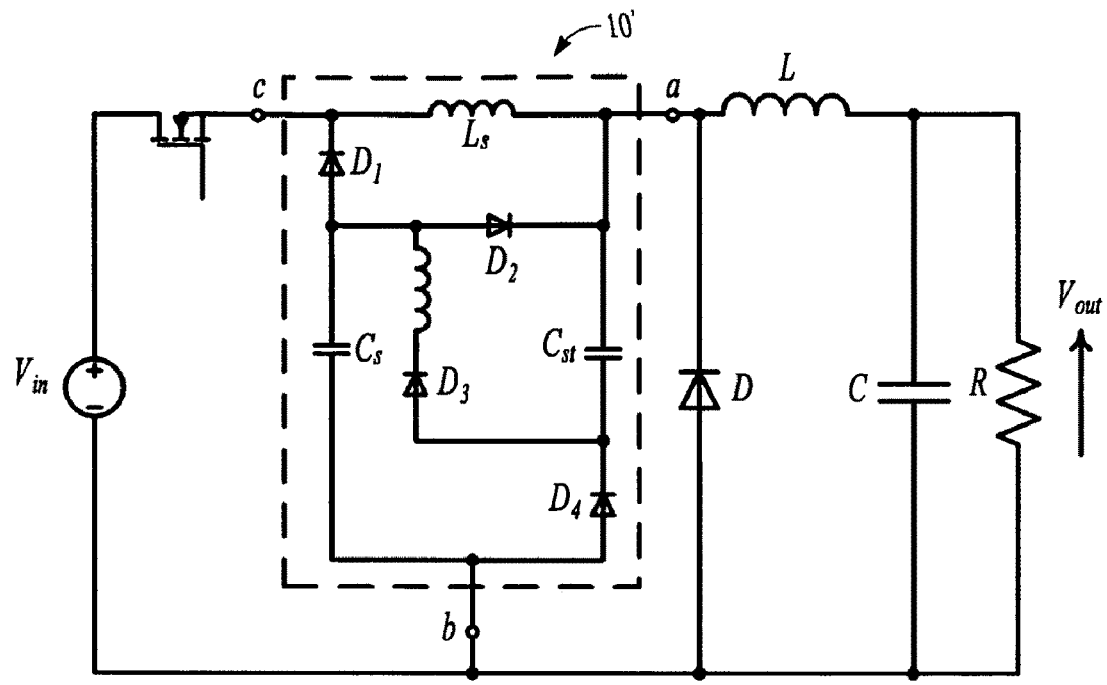

FIGS. 9(a) and (b) show the switching waveforms of the main switch with and without the experimental snubber cell respectively. FIGS. 10(a) and (b) show the x-y plots corresponding to FIG. 9(a) and (b). With the experimental snubber cell according to the invention, the trajectory loop area, and thus the switching loss, was significantly reduced. FIG. 11 shows the converter efficiency against load power. By the experimental snubber cell, the efficiency was higher by about 2% than hard switching.

FIGS. 12 to 27 depict how a snubber cell or snubber cells according to the invention is/are integrated into different types of power converter circuit of types that will be familiar to one skilled in the art. The novel resulting converter circuits provides advantages over known such converter circuits by virtue of the advantages provided by the inclusion in said circuits of the novel snubber cell or cells according to the invention. The manner of integration will be understood by one skilled in the art from the various depictions of FIGS. 12 to 27.

Figure 28:
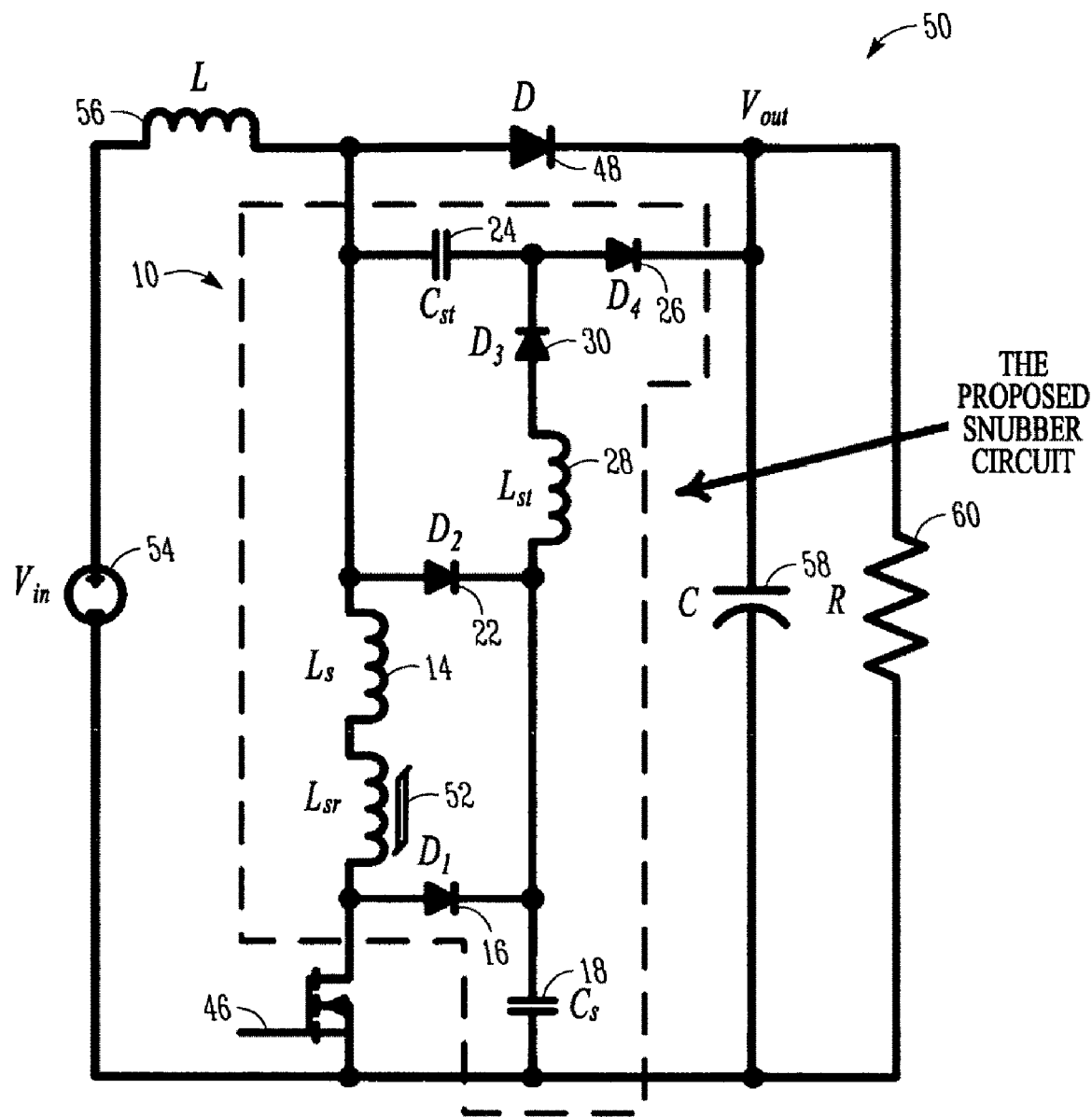
FIG. 28 shows a schematic circuit diagram for a boost converter including a lossless snubber cell according to the invention.

In considering more particularly a boost power converter with a snubber cell according to the invention, reference is made to FIG. 28 which depicts a boost power factor correction (PFC) converter with a snubber cell according to the invention. Boost converters are typically employed in ac/dc power applications and, for high power applications, the converter is usually operated in the continuous conduction mode (CCM).

Operating Principles of the Boost PFC Converter.

FIG. 28 shows the circuit schematic of the boost PFC converter 50 including a lossless snubber cell according to the invention. Like numerals to those used in earlier figures will be used to denote like parts. The converter 50 includes a voltage source 54, main inductor 56, a main diode 48, a main capacitor 58 and a load 60 arranged in atypical boost converter arrangement. The snubber cell 10 is incorporated into the converter circuit as illustrated in FIG. 28.

Figure 29:
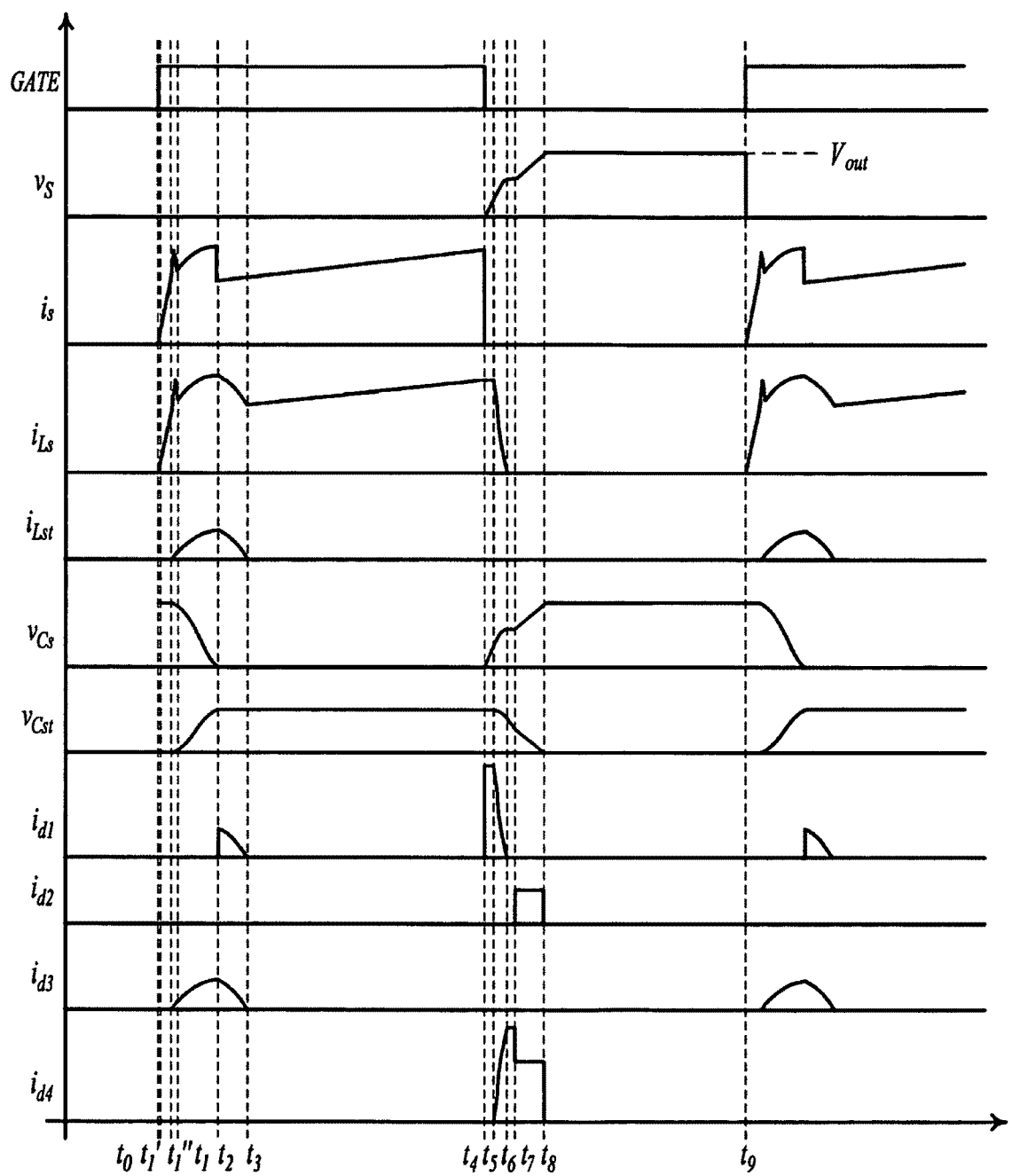
FIG. 29 illustrates the voltage and current waveforms in the operation of the boost converter of FIG. 28.

Voltage and current waveforms for the converter are illustrated in FIG. 29.

Figure 14:
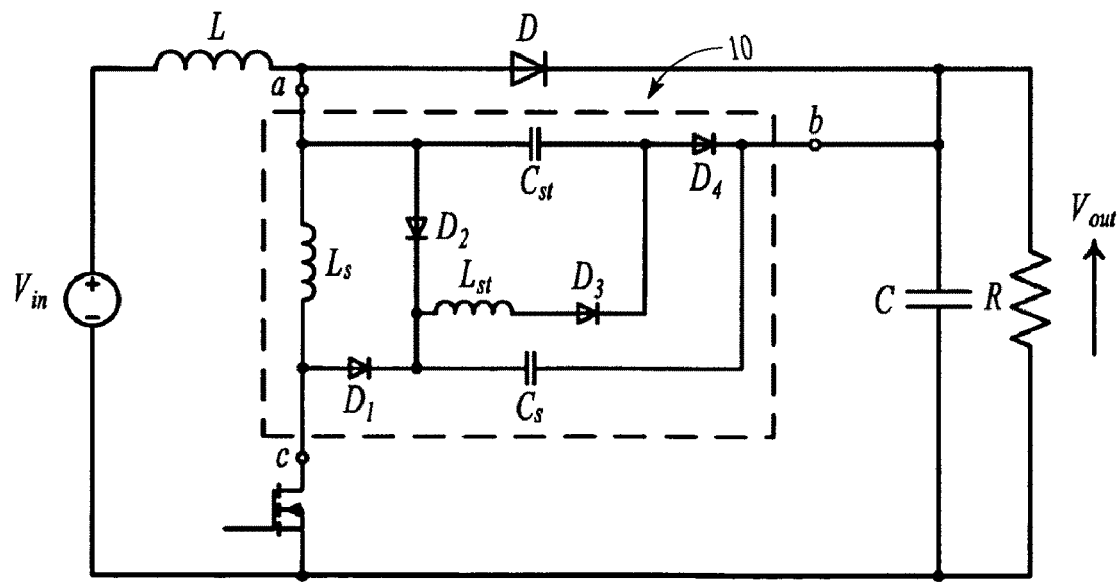
Figure 15:
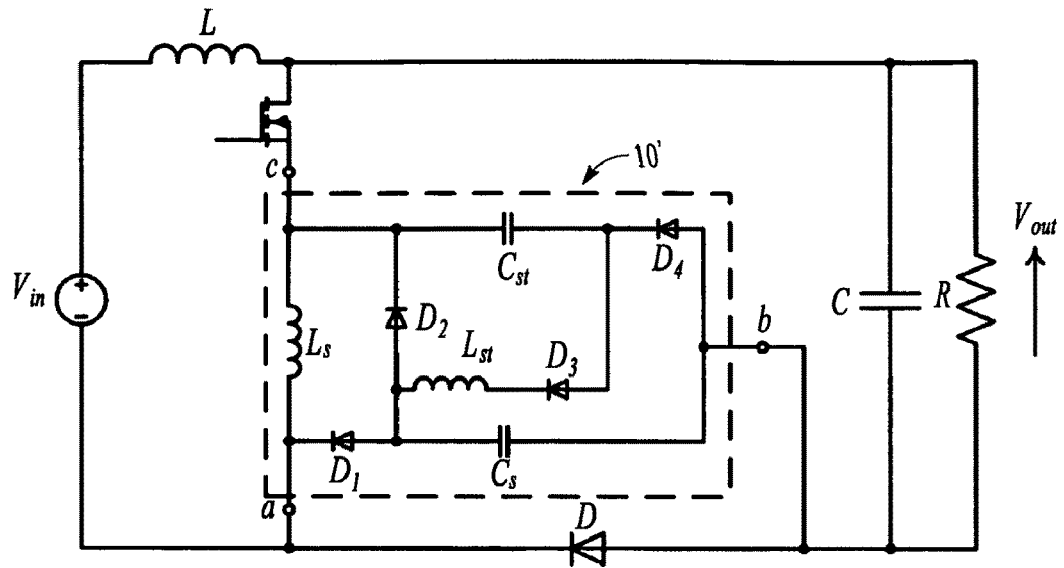
Figure 16:
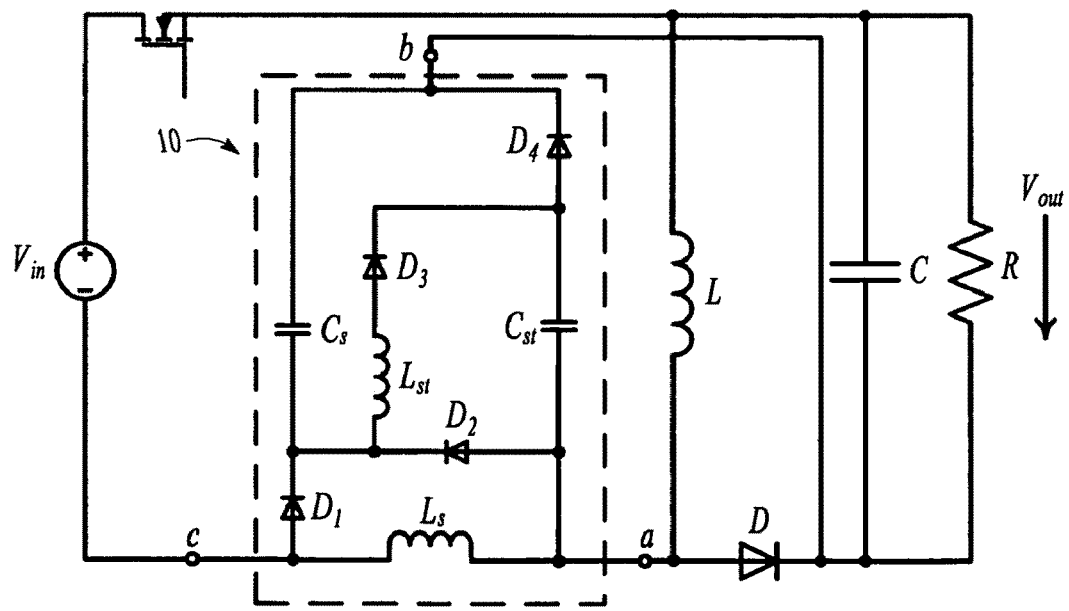
Figure 17:
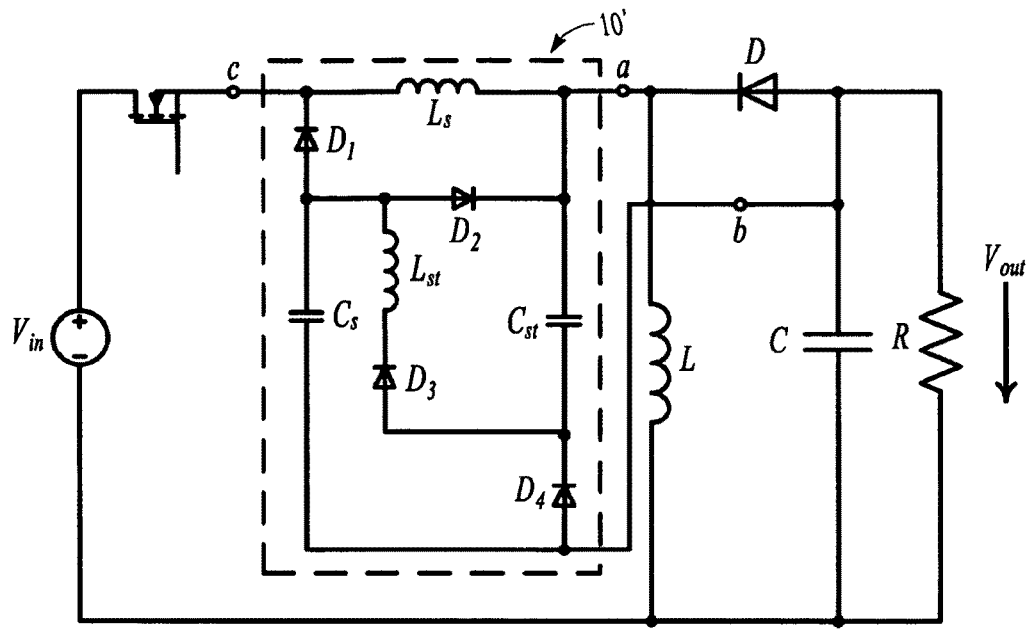
Figure 18:
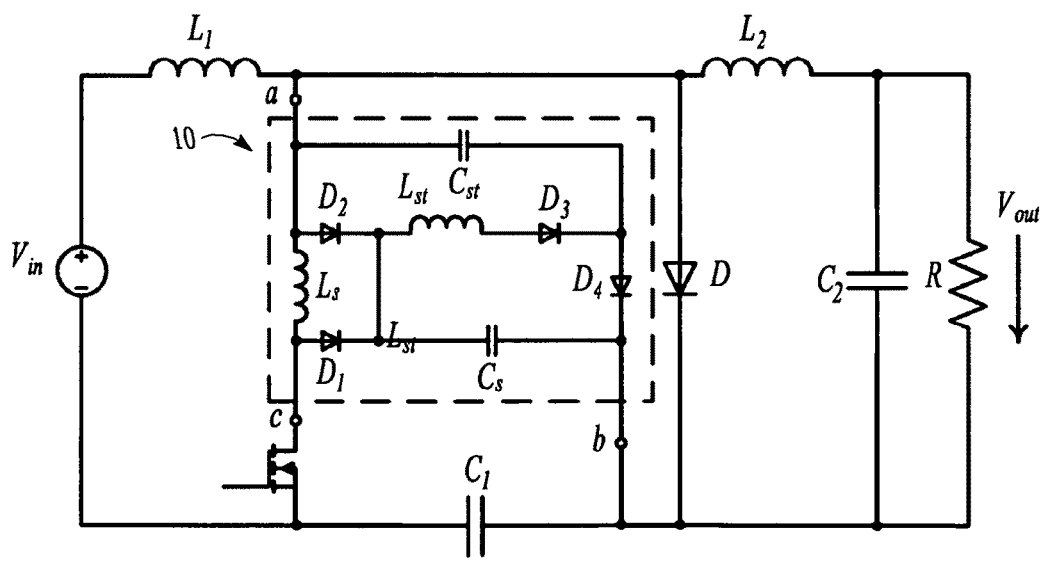
Figure 19:
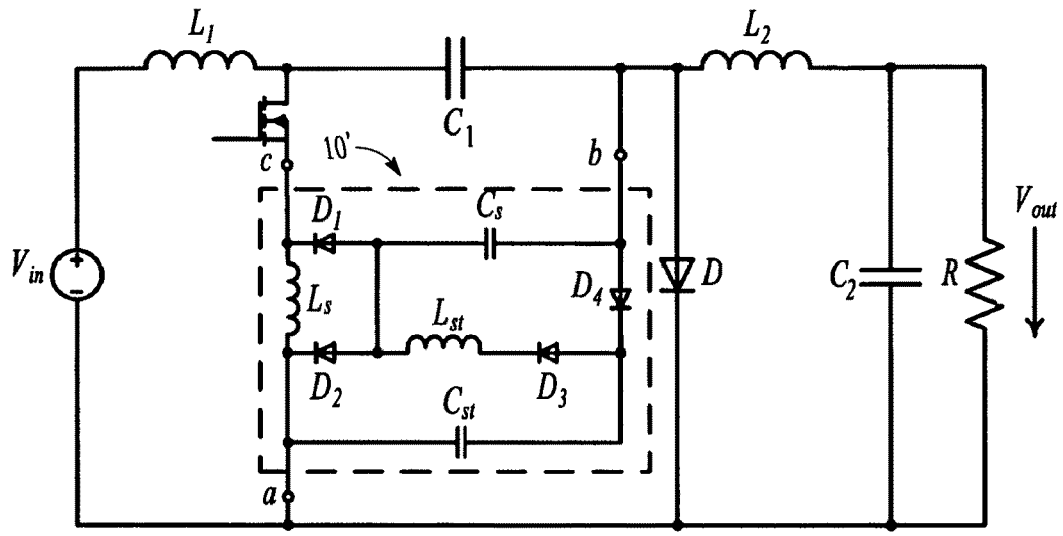
Figure 20:
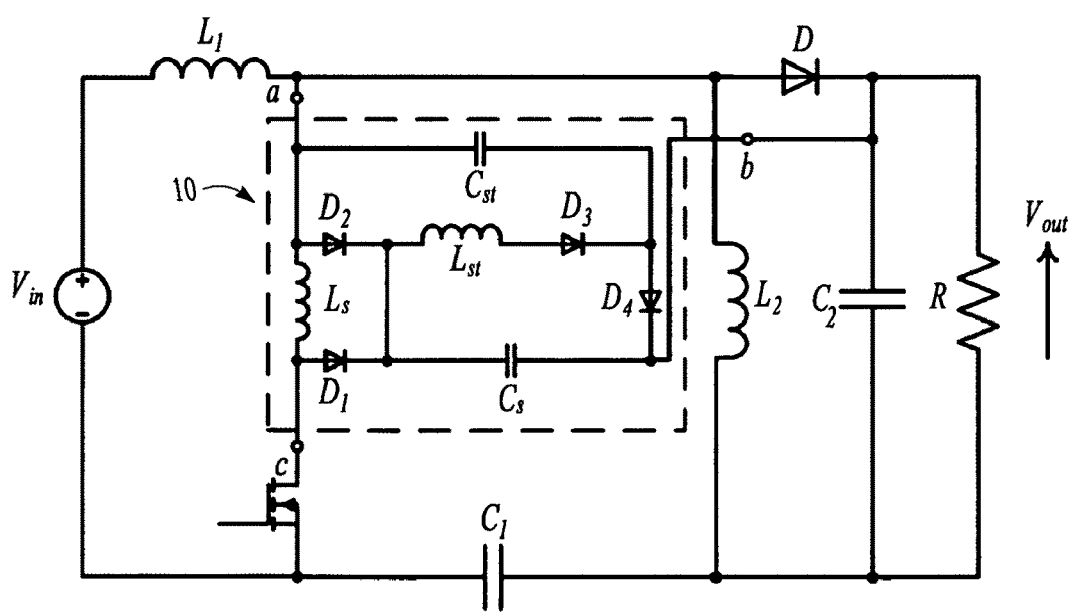
Figure 21:
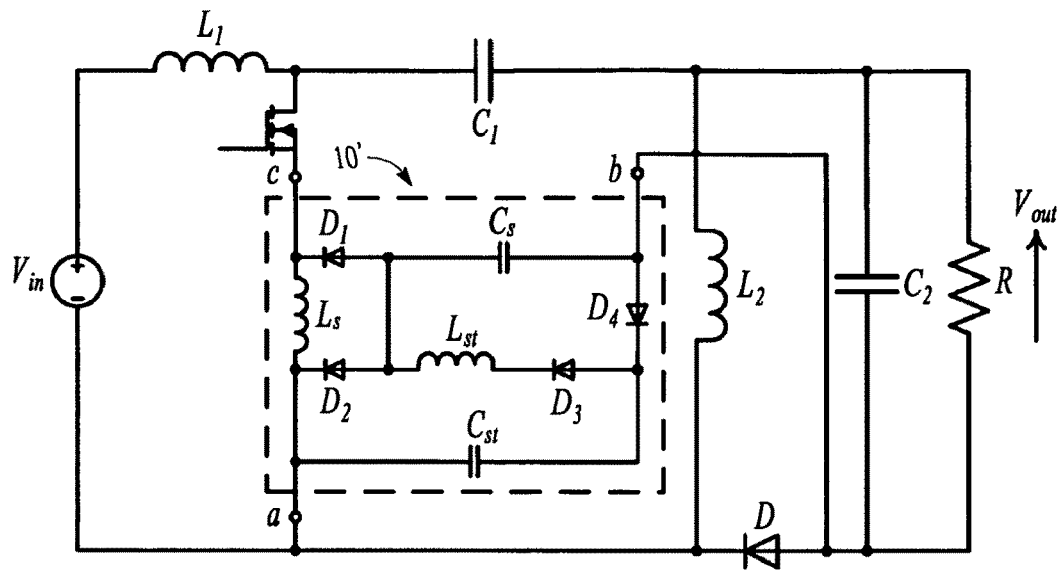
Figure 22:
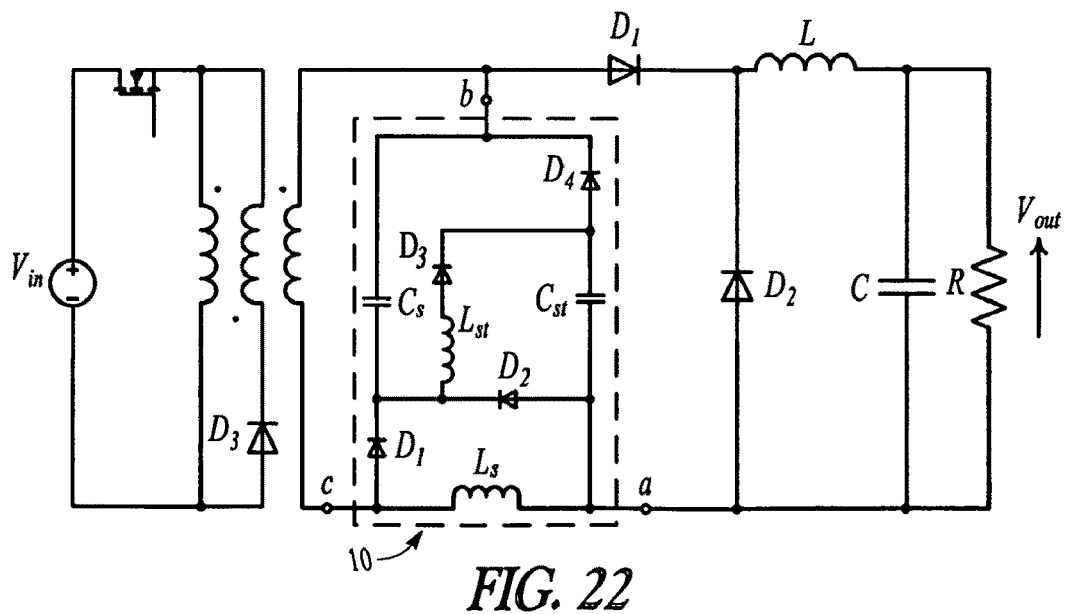
Figure 23:
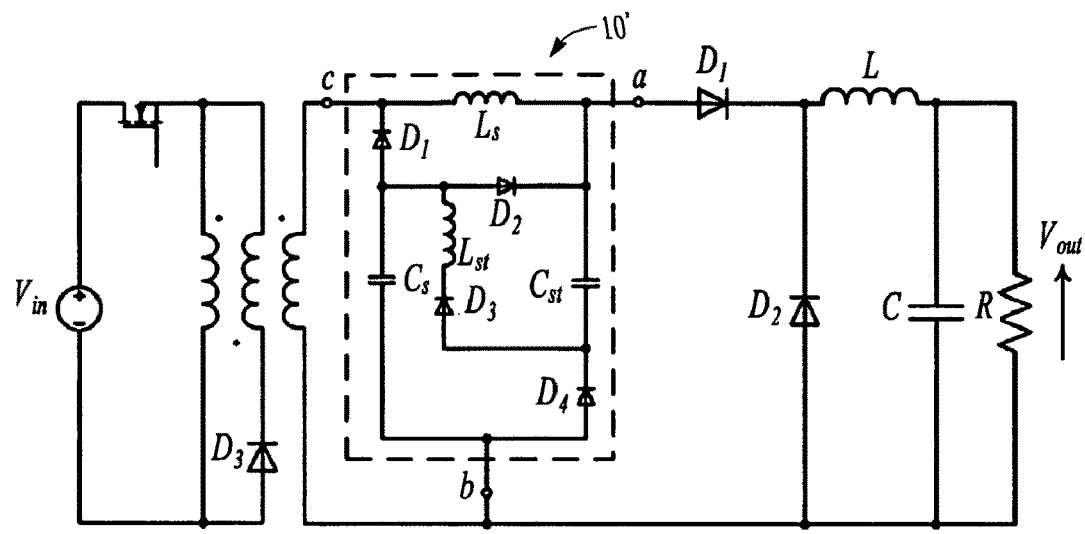
Figure 24:
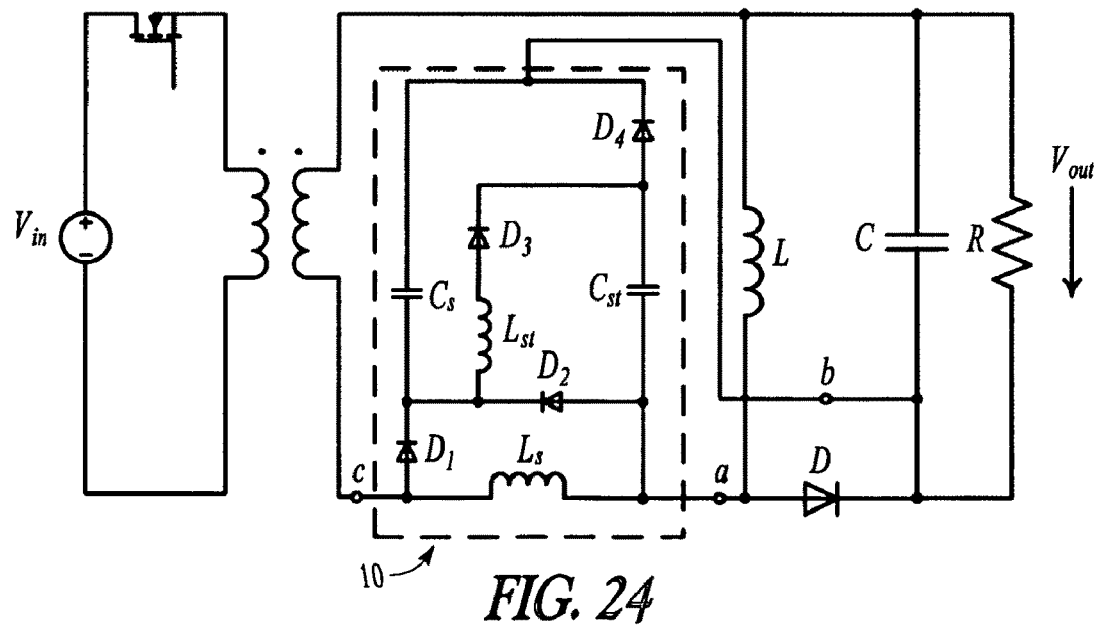
Figure 25:
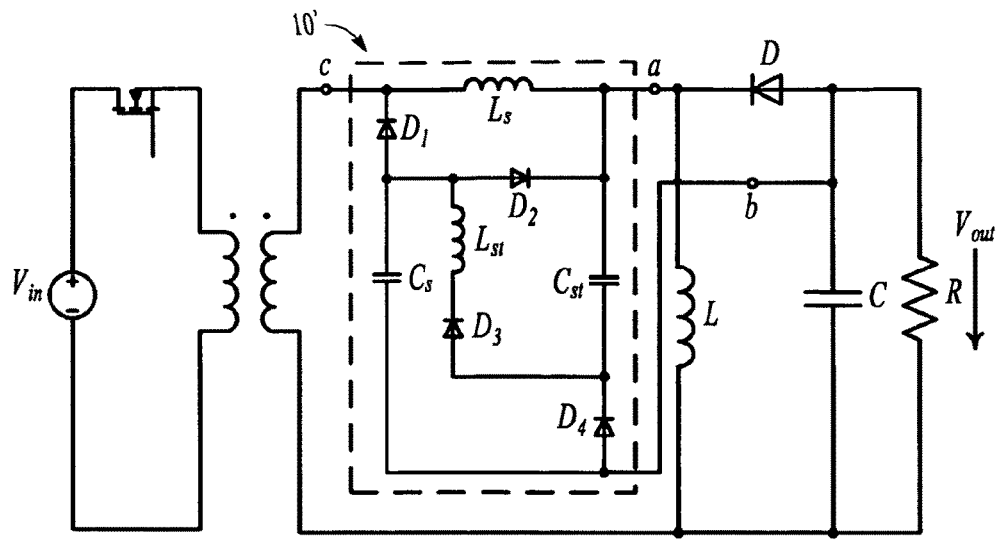
Figure 26:
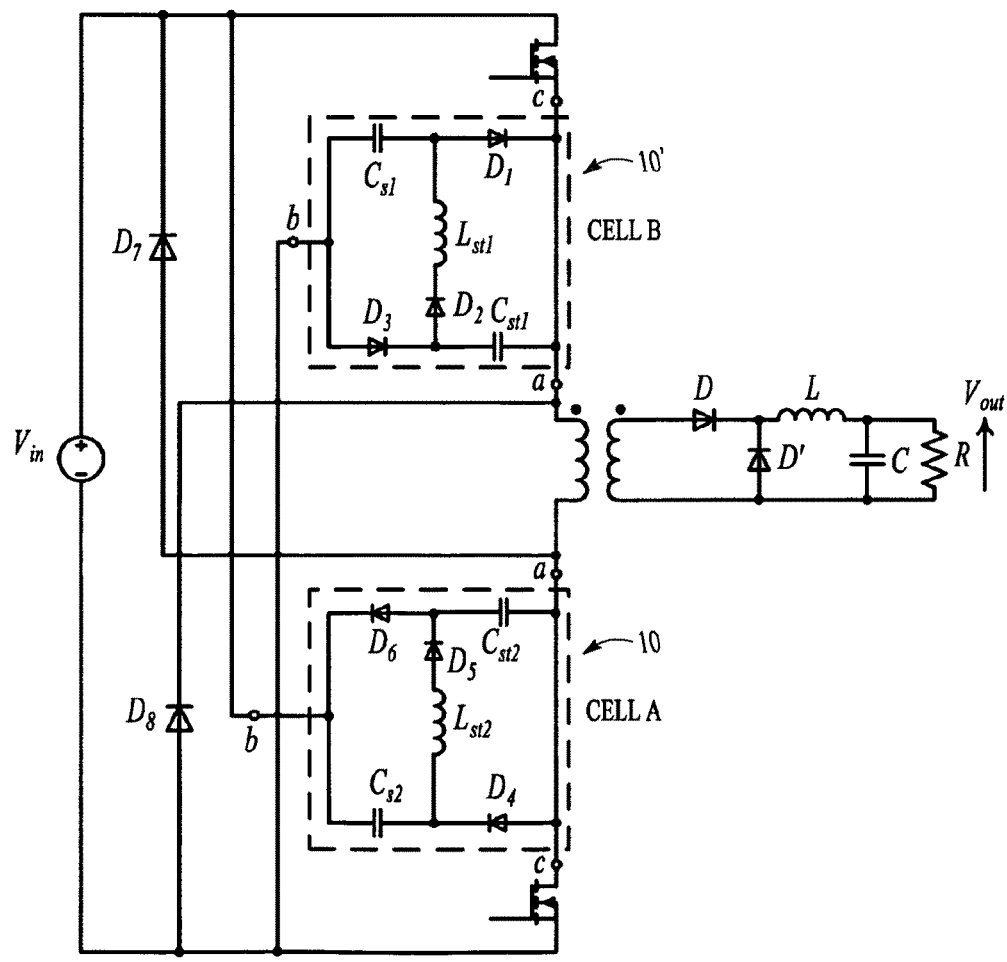
Figure 27:
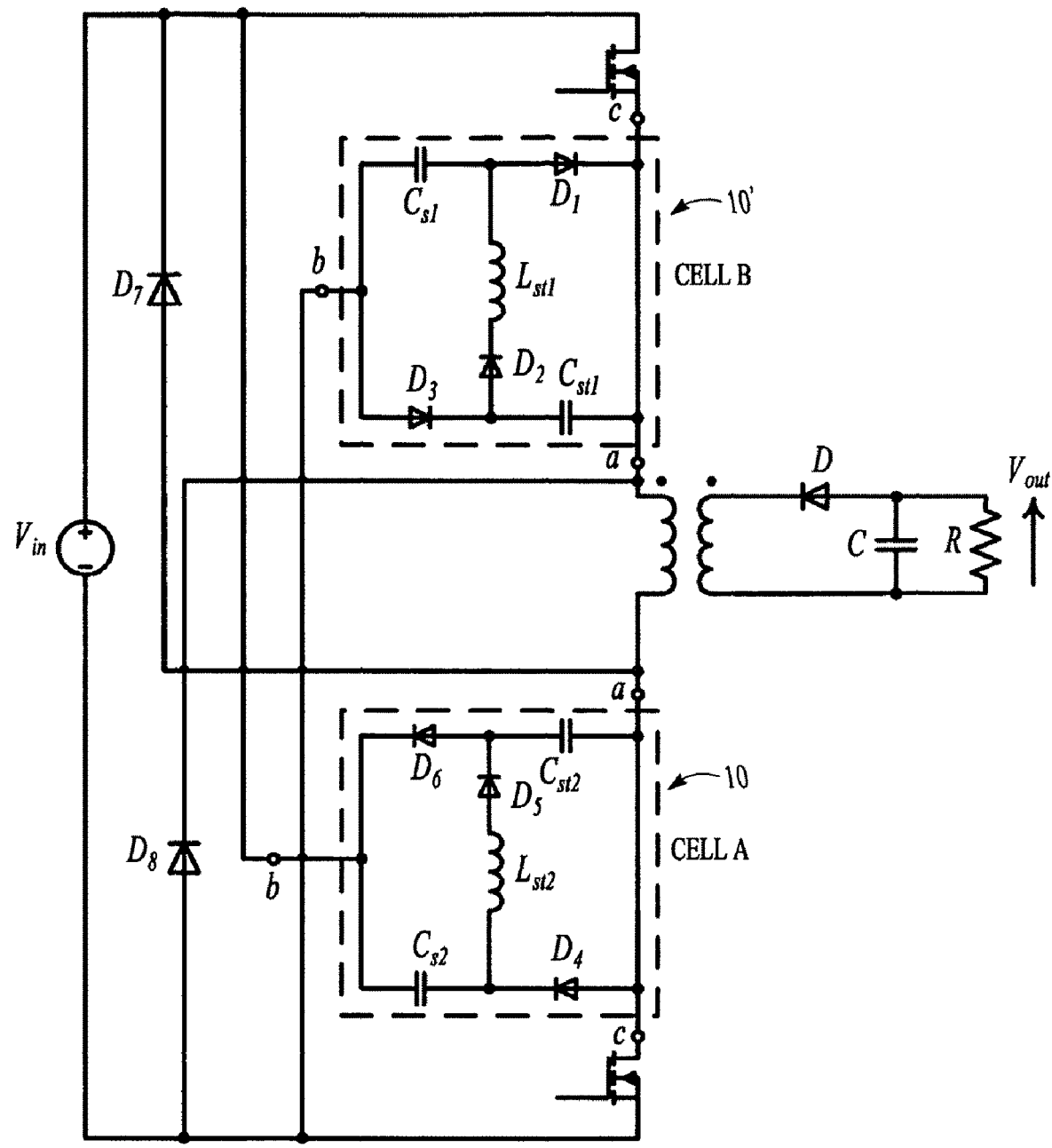

The boost PFC converter of FIG. 28 has a snubber cell 10 with a generally similar structure to the snubber cells of FIGS. 14 and 15, but includes a saturable inductor $L_{sr}$ 52 in series with the snubber inductor $L_s$. The saturable inductor $L_{sr}$ 52 functions to further delay the rise of the switch current following a switching on action of the switch which further reduces switching losses over known snubber cells or converters incorporating known snubber cells. The presence of a saturable inductor $L_{sr}$ in series with the snubber inductor means that the required value, or energy absorbing capacity, of the snubber inductor $L_s$ is small compared to known snubber cells. Also, as the energy stored in the saturable inductor $L_{sr}$ is small, it does not affect the energy resetting period of the snubber cell.

It will be understood that a saturable inductor 52 as described above with respect to FIG. 28 could be employed for the same purpose in any of snubber cells in any of the converters depicted by FIGS. 12 to 27 and in any of the snubber cells depicted by FIGS. 2 and 3.

There are eight operating modes in one switching cycle for the converter of FIG. 28 and these are illustrated by FIG. 30*a-j*. For the sake of simplicity in the following description, the following assumptions have been made.

1) All semiconductor switching devices are ideal. They have zero on-state resistance, infinite off-state resistance and zero junction capacitance.
2) All energy storage components have no parasitic elements and are thus free of loss.
3) The input is considered as a constant current source of value equal to $I_{in}$.

Before the start of a switching cycle, the converter is in the freewheeling stage as shown in FIG. 30(*j*). The cyclical operation is described as follows.

Mode 1*a* [FIG. 30(*a*)] ($t_0 \leq t < t_1'$): The main switch is turned on with zero current. The inductor $L_s$ and saturable inductor $L_{sr}$ limit the rate of rise of the switch current.

$$(L_s + L_{sr})\frac{di_{Ls}}{dt} = V_{out} \tag{B1}$$

where $i_{Ls}$ is the current through $L_s$ and $V_{out}$ is the output voltage.

This mode ends at $t_1'$ when $L_{sr}$ is saturated at $i_{Ls}=I_{sat}$. Thus, $$t_1' - t_0 = \frac{(L_s + L_{sr})I_{sat}}{V_{out}} \tag{B2}$$

Mode 1*b* [FIG. 30(*b*)] ($t_1' \leq t < t_1''$): Since $L_{sr}$ is saturated, the rate of rise of the switch current is limited by $L_s$. Thus, $$L_s \frac{di_{Ls}}{dt} = V_{out} \tag{B3}$$

This mode ends when the switch current equals the input inductor current $I_{in}$. Hence, $$t_1'' - t_1' = \frac{L_s(I_{in} - I_{sat})}{V_{out}} \tag{B4}$$

Mode 1*c* [FIG. 30(*b*)] ($t_1'' \leq t < t_1$): The output diode enters into the reverse recovery process. The duration of the process is approximated by the following equation $$\frac{1}{2}(t_1 - t_1'')I_{rr} = \Delta Q_{rr} \tag{B5}$$

$$t_1 - t_1'' = \frac{2\Delta Q_{rr}}{I_{rr}}$$

where $\Delta Q_{rr}$ is the reverse recovery charge of the diode, $I_{rr}$ is the peak reverse-recovery current, and S is snappiness factor.
Since $$L_s \frac{I_{rr}}{t_1 - t_1''}(1 + S) = V_{out} \tag{B6}$$

Equation (B5) can be expressed as $$I_{rr} = \sqrt{\frac{2\Delta Q_{rr} V_{out}}{L_s(1 + S)}} \tag{B7}$$

The peak current $\hat{I}_S$ flowing through the switch is $$\hat{I}_S = I_{in} + I_{rr} \tag{B8}$$

By using (B5) and (B7), the diode is completely off when $$t_1 - t_1'' = \sqrt{\frac{2\Delta Q_{rr} L_s(1 + S)}{V_{out}}} \tag{B9}$$

Mode 2*a* [FIG. 30(*c*)] ($t_1 \leq t < t_2$): The energy stored in $C_s$ is transferred to $C_{st}$ through the resonance path $C_s$-$L_{st}$-$D_3$-$C_{st}$-$L_s$.

$$i_{Ls}(t) = I_{in} + \frac{V_{out}}{Z_{2a}} \sin\omega_{2a}(t - t_1) \quad \text{(B10)}$$

$$i_{Lst}(t) = i_{Ls}(t) - I_{in} = \frac{V_{out}}{Z_{2a}} \sin\omega_{2a}(t - t_1) \quad \text{(B11)}$$

$$v_{Cs}(t) = V_{out}\left[\frac{1}{1+x}[x + \cos\omega_{2a}(t - t_1)]\right] \quad \text{(B12)}$$

$$v_{Cst}(t) = V_{out}\frac{x}{1+x}[1 - \cos\omega_{2a}(t - t_1)] \quad \text{(B13)}$$

where, $$Z_{2a} = \sqrt{\frac{L_{eq}}{C_{eq}}}, \quad \omega_{2a} = \frac{1}{\sqrt{L_{eq}C_{eq}}},$$

$$L_{eq} = L_s + L_{st},$$

$$C_{eq} = \frac{C_s C_{st}}{C_s + C_{st}},$$

and $$x = \frac{C_s}{C_{st}}$$

is the ratio between $C_s$ and $C_{st}$.

This mode ends when $v_{Cs}(t_2) = 0$. Thus, by using (B12), $$\cos\omega_{2a}(t_2 - t_1) = -x \quad \text{(B14)}$$

By substituting (B14) into (B13), $$v_{Cst}(t_2) = xV_{out} \quad \text{(B15)}$$

In order to ensure the existence of $t_2$ for discharging $C_s$ completely, i.e., $v_{Cs}(t_2) = 0$, the value of x in (14) should be less than or equal to one. Therefore, $$C_{st} \geq C_s \quad \text{(B16)}$$

$$t_2 - t_1 = \frac{1}{\omega_{2a}}\left(\frac{\pi}{2} + \sin^{-1}x\right) \quad \text{(B17)}$$

$$\sin\omega_{2a}(t_2 - t_1) = \sqrt{1 - x^2} \quad \text{(B18)}$$

By substituting (B18) into (B10) and (B11), $$i_{Ls}(t_2) = I_{in} + \sqrt{\frac{C_s}{L_{eq}}}\sqrt{1-x}\,V_{out} \quad \text{(B19)}$$

$$i_{Lst}(t_2) = \sqrt{\frac{C_s}{L_{eq}}}\sqrt{1-x}\,V_{out} \quad \text{(B20)}$$

Figure 30A:
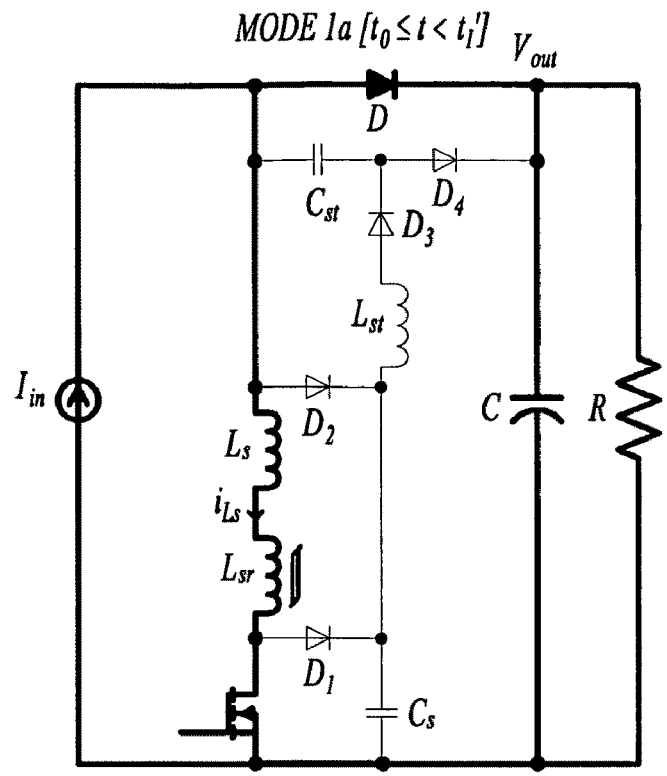
FIG. 30a-j the modes of operation of the snubber cell in the boost converter of FIG. 28.
Figure 30B:
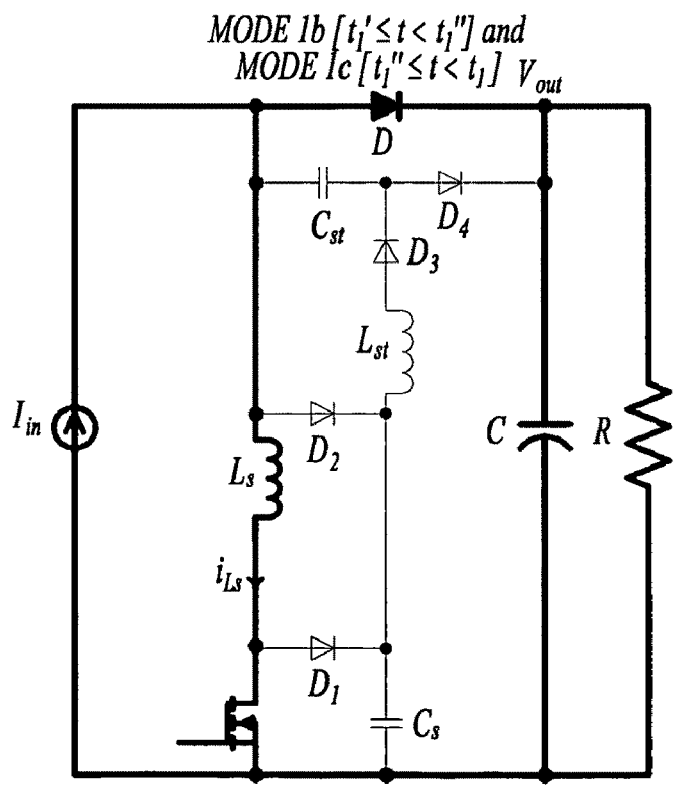
Figure 30C:
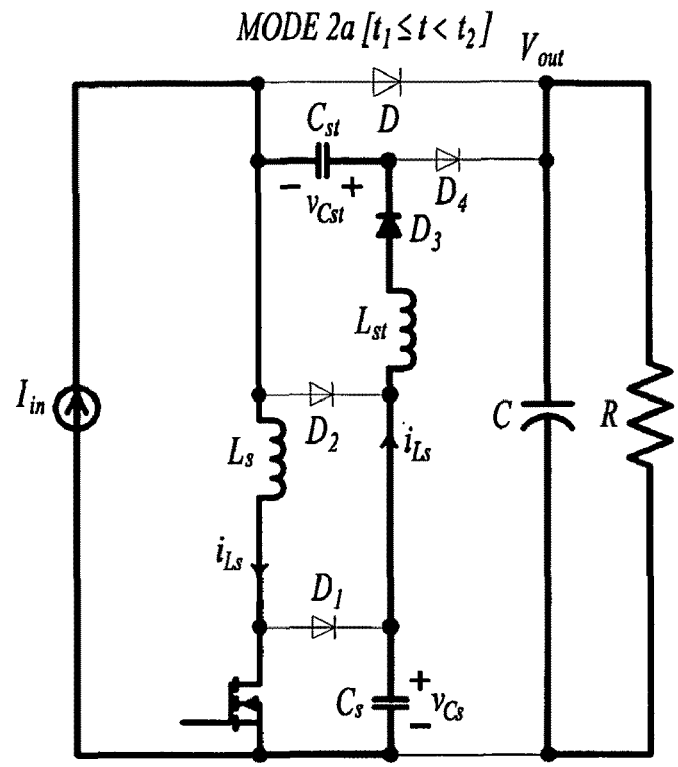
Figure 30D:
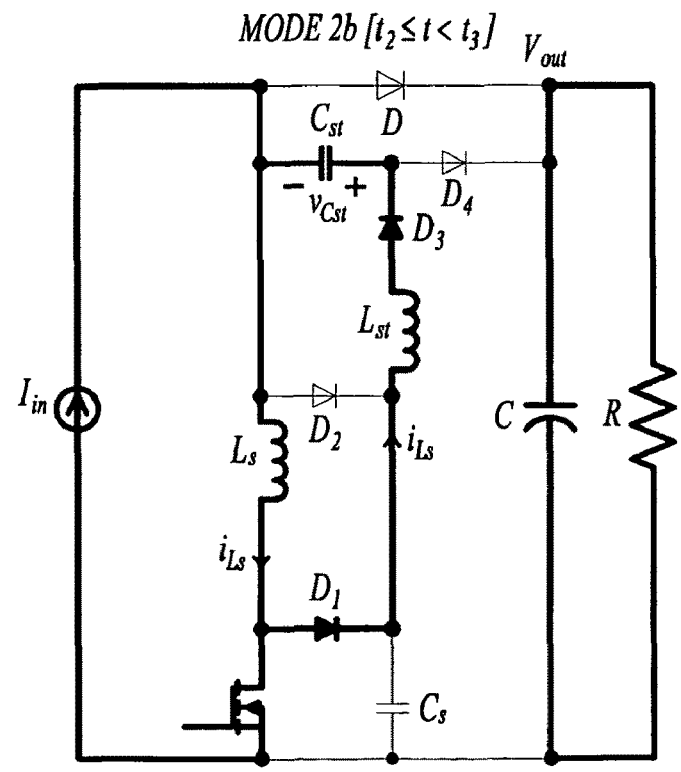

Mode 2b [FIG. 30(d)] ($t_2 < t < t_3$): $D_1$ conducts. The energy stored in $L_{st}$ is transferred to $C_{st}$ through the resonance path, $D_1$-$L_{st}$-$D_3$-$C_{st}$-$L_s$.

$$i_{Ls}(t) = I_{in} + V_{out}\sqrt{\frac{C_s}{L_{eq}}}\cos[\omega_{2b}(t - t_2) + \phi_{2b}] \quad \text{(B21)}$$

$$i_{Lst}(t) = V_{out}\sqrt{\frac{C_s}{L_{eq}}}\cos[\omega_{2b}(t - t_2) + \phi_{2b}] \quad \text{(B22)}$$

$$v_{Cs}(t) = 0 \quad \text{(B23)}$$

$$v_{Cst}(t) = \sqrt{x}\,V_{out}\sin[\omega_{2b}(t - t_2) + \phi_{2b}] \quad \text{(B24)}$$

where $$Z_{2b} = \sqrt{\frac{L_{eq}}{C_{st}}},$$

$$\omega_{2b} = \frac{1}{\sqrt{L_{eq}C_{st}}},$$

and $$\phi_{2b} = \tan^{-1}\sqrt{\frac{x}{1-x}}.$$

This mode ends when $L_{st}$ is fully discharged, i.e., $i_{Lst}(t_3) = 0$. Thus, by using (B22), $$t_3 - t_2 = \frac{1}{\omega_{2b}}\tan^{-1}\sqrt{\frac{1-x}{x}} \quad \text{(B25)}$$

By substituting (B25) into (B21)-(B24), it can be shown that $$i_{Ls}(t_3) = I_{in} \quad \text{(B26)}$$

$$i_{Lst}(t_3) = 0 \quad \text{(B27)}$$

$$v_{Cs}(t_3) = 0 \quad \text{(B28)}$$

$$v_{Cst}(t_3) = \sqrt{x}\,V_{out} \quad \text{(B29)}$$

Figure 30E:
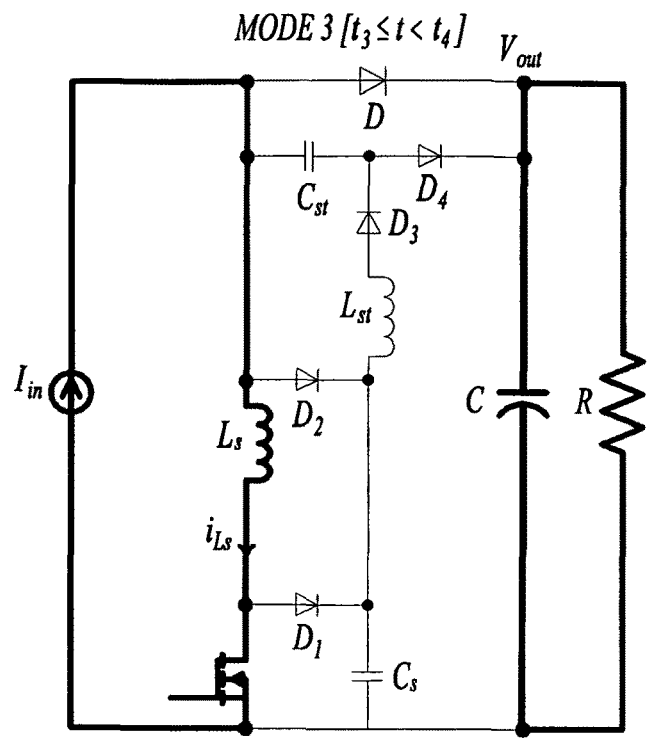

Mode 3 [FIG. 30(e)] ($t_3 < t < t_4$): The switch current equals $I_{in}$. This mode defines the duty cycle of the main switch. Equations (B26)-(B29) still hold in this mode. This mode ends when the main switch is switched off with zero voltage at $t_4$.

Figure 30F:
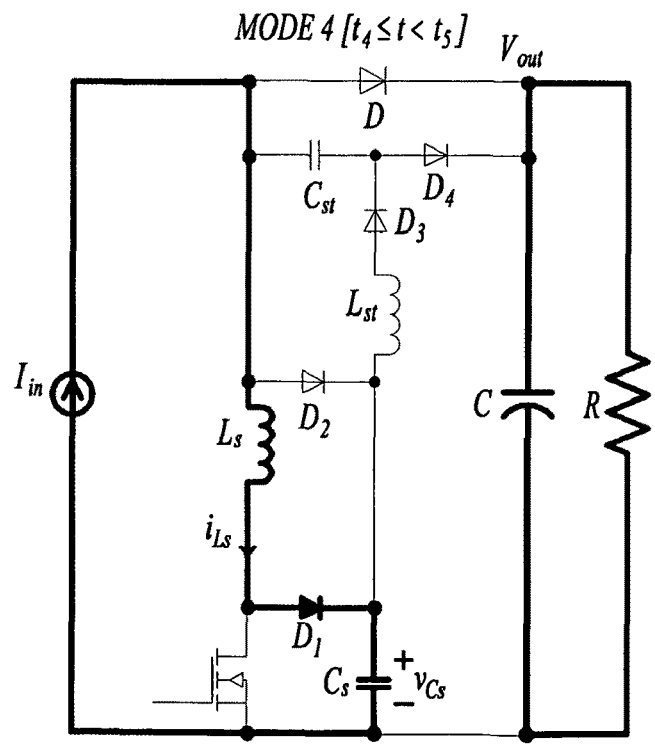

Mode 4 [FIG. 30(f)] ($t_4 < t < t_5$): $C_s$ is charged up by $I_{in}$. Thus, $$i_{Ls}(t) = I_{in} \quad \text{(B30)}$$

$$i_{Lst}(t) = 0 \quad \text{(B31)}$$

$$v_{Cs}(t) = \frac{I_{in}}{C_s}(t - t_4) \quad \text{(B32)}$$

$$v_{Cst}(t) = \sqrt{x}\,V_{out} \quad \text{(B33)}$$

This mode ends at $t_5$ when $$v_{Cs}(t_5) = V_{out} - v_{Cst}(t_5) \quad \text{(B34)}$$

$$= (1 - \sqrt{x})V_{out}$$

By using (B32), $$t_5 - t_4 = (1 - \sqrt{x})\frac{C_s}{I_{in}}V_{out} \qquad (B35)$$

Figure 30G:
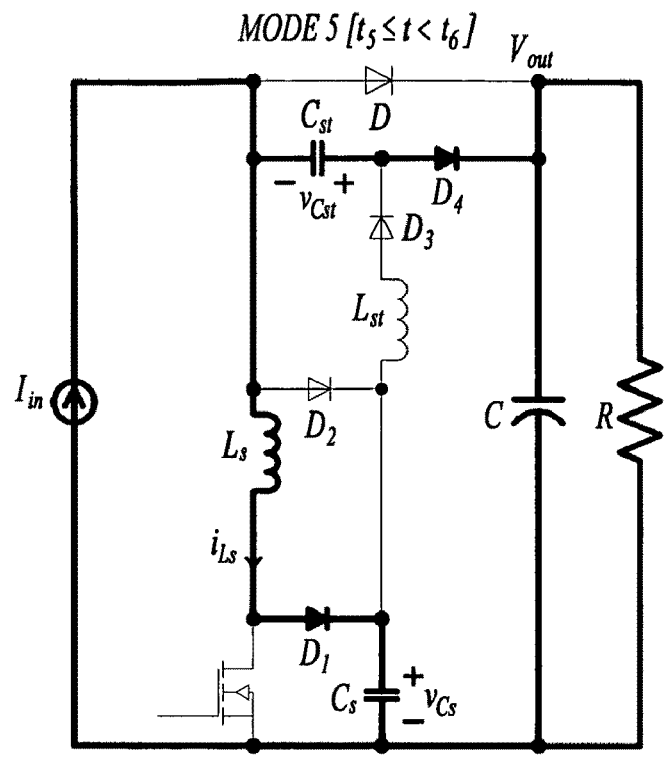

Mode 5 [FIG. 30(g)] ($t_5<t<t_6$): $C_s$ continues to be charged up by the input inductor. $C_{st}$ starts discharging to the load through $D_4$.

$$i_{Ls}(t) = \frac{I_{in}}{1+x}[x + \cos\omega_5(t - t_5)] \qquad (B40)$$

$$i_{Lst}(t) = 0 \qquad (B41)$$

$$v_{Cs}(t) = \qquad (B42)$$
$$V_{out}(1 - \sqrt{x}) + \frac{I_{in}}{C_{st}(1+x)}(t - t_5) + \frac{I_{in}}{x\omega_5 C_{st}(1+x)}\sin\omega_5(t - t_5)$$

$$v_{Cst}(t) = V_{out}\sqrt{x} - \frac{I_{in}}{C_{st}(1+x)}(t - t_5) + \frac{I_{in}}{\omega_5 C_{st}(1+x)}\sin\omega_5(t - t_5) \qquad (B43)$$

where $$\omega_5 = \frac{1}{\sqrt{L_s C_{eq}}}.$$

This mode ends at $t_6$ when $i_{Ls}(t_6)=0$. By using (B40), $$t_6 - t_5 \cong \frac{1}{\omega_5}\left(\frac{\pi}{2} + \sin^{-1}x\right) \qquad (B45)$$

$$i_{Lst}(t_6) = i_{Lst}(t_5) = 0 \qquad (B46)$$

$$v_{Cs}(t_6) \cong \qquad (B47)$$
$$(1 - \sqrt{x})V_{out} + I_{in}\sqrt{\frac{L_s}{C_{st}}}\frac{\sqrt{x}}{(1+x)\sqrt{1+x}}\left(\frac{\pi}{2} + \sin^{-1}x + \frac{\sqrt{1-x^2}}{x}\right)$$

$$v_{Cst}(t_6) = \sqrt{x}\,V_{out} - \frac{I_{in}}{1+x}\sqrt{\frac{L_s}{C_{st}}}\sqrt{\frac{x}{1+x}}\left(\frac{\pi}{2} + \sin^{-1}x - \sqrt{1-x^2}\right) \qquad (B48)$$

Figure 30H:
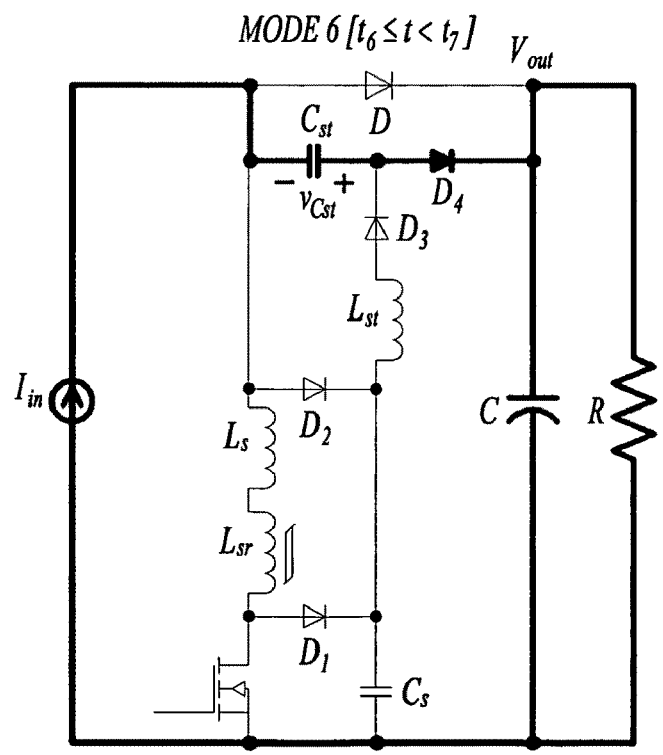

Mode 6 [FIG. 30(h)] ($t_6<t<t_7$): $C_{st}$ is discharged to the load by $I_{in}$.

$$i_{Ls}(t) = 0 \qquad (B49)$$

$$i_{Lst}(t) = 0 \qquad (B50)$$

$$v_{Cs}(t) = v_{Cs}(t_6) \qquad (B51)$$

$$v_{Cst}(t) = v_{Cst}(t_6) - \frac{I_{in}}{C_{st}}(t - t_6) \qquad (B52)$$

This mode ends at $t_7$ when $$v_{Cst}(t_7) = V_{out} - v_{Cs}(t_6) \qquad (B53)$$

By using (B51) and (B52), $$t_7 - t_6 = \sqrt{L_s C_{st}}\sqrt{\frac{1-x}{x}} \qquad (B54)$$

$$v_{Cst}(t_7) = \sqrt{x}\,V_{out} - \qquad (B55)$$
$$I_{in}\sqrt{\frac{L_s}{C_{st}}}\frac{1}{1+x}\sqrt{\frac{x}{1+x}}\left(\frac{\pi}{2} + \sin^{-1}x + \frac{\sqrt{1-x^2}}{x}\right)$$

Figure 30I:
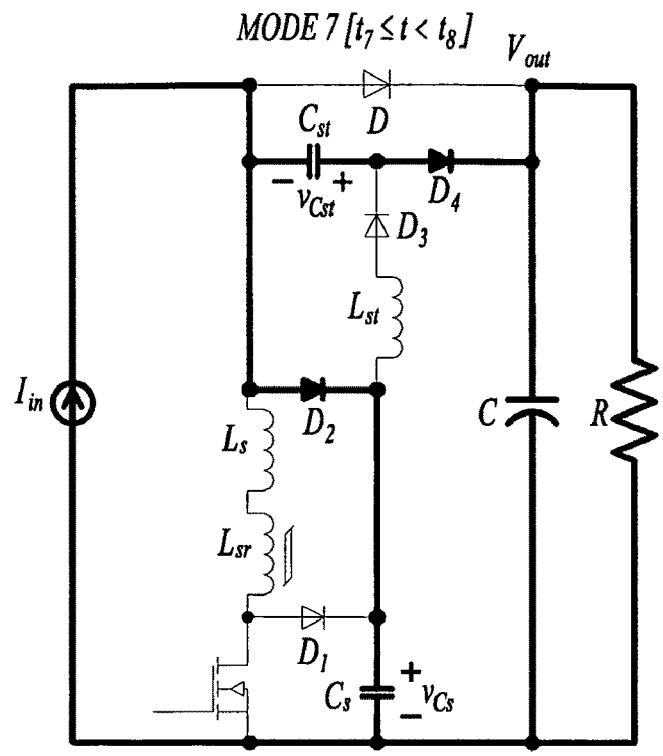

Mode 7 [FIG. 30(i)] ($t_7<t<t_8$): $C_s$ continues to be charged up by $I_{in}$ through $D_2$ and $C_{st}$ continues to discharge to the load. This mode ends when $C_{st}$ is fully discharged.

$$i_{Ls}(t) = 0 \qquad (B56)$$

$$i_{Lst}(t) = 0 \qquad (B57)$$

$$v_{Cs}(t) = V_{out} - v_{Cst}(t_7) + \frac{I_{in}}{C_{st}(1+x)}(t - t_7) \qquad (B58)$$

$$v_{Cst}(t) = v_{Cst}(t_7) - \frac{I_{in}}{C_{st}(1+x)}(t - t_7) \qquad (B59)$$

This mode ends at $t_8$ when $v_{Cst}(t_8)=0$ and $v_{Cs}(t_8)=V_{out}$. By using (B55) and (B59), $$t_8 - t_7 = \sqrt{L_s C_s}\left[\frac{V_{out}}{I_{in}}\sqrt{\frac{C_s}{xL_s}}(1+x) - \frac{1}{\sqrt{1+x}}\left[\frac{\frac{\pi}{2} + \sin^{-1}x +}{\frac{\sqrt{1-x^2}}{x}}\right]\right] \qquad (B60)$$

Figure 30J:
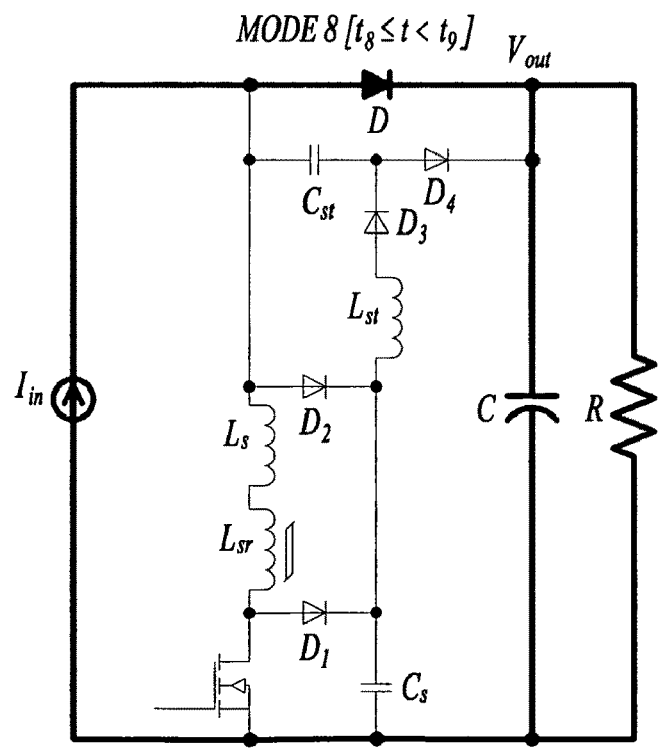

Mode 8 [FIG. 30(j)] ($t_8<t<t_9$): D conducts and $I_{in}$ will supply to the load. This mode ends when the main switch is turned on again. This completes one switching cycle.

Operating Range of the Snubber and Stress on the Boost PFC Converter Switch

The operating range of the passive lossless snubber shown in FIG. 28 is defined by the minimum on time $t_{on,min}$ and minimum off time $t_{off,min}$ of the main switch. $t_{on,min}$ is the minimum time required to transfer the energy stored in the snubber capacitor $C_s$ to the reset circuit while $t_{off,min}$ is the minimum time required to transfer the energy stored in the reset circuit to the other part of the converter circuit. The value of $t_{on,min}$ of the proposed snubber is the time taken from Mode 1 to Mode 2b (i.e., from $t_0$ to $t_3$) while the one of $t_{off,min}$ is the time taken from Mode 4 to Mode 7 (i.e., from $t_4$ to $t_8$). $t_{on,min}$ is obtained by adding up the time durations given in (B2), (B4), (B17), and (B25), and $t_{off,min}$ is obtained by adding up the time durations given in (B35), (B45), (B54), and (B60). Thus, $$t_{on,min} = \qquad (B61)$$
$$\frac{(L_s + L_{sr})I_{sat}}{V_{out}} + \frac{L_s I_{in}}{V_{out}} + \frac{1}{\omega_{2a}}\left(\frac{\pi}{2} + \sin^{-1}x\right) + \frac{1}{\omega_{2b}}\tan^{-1}\sqrt{\frac{1-x}{x}}$$

and $$t_{off,min} = \frac{C_s V_{out}}{I_{in}}\left(1 + \frac{1}{\sqrt{x}}\right) \qquad (B62)$$

Figure 31:
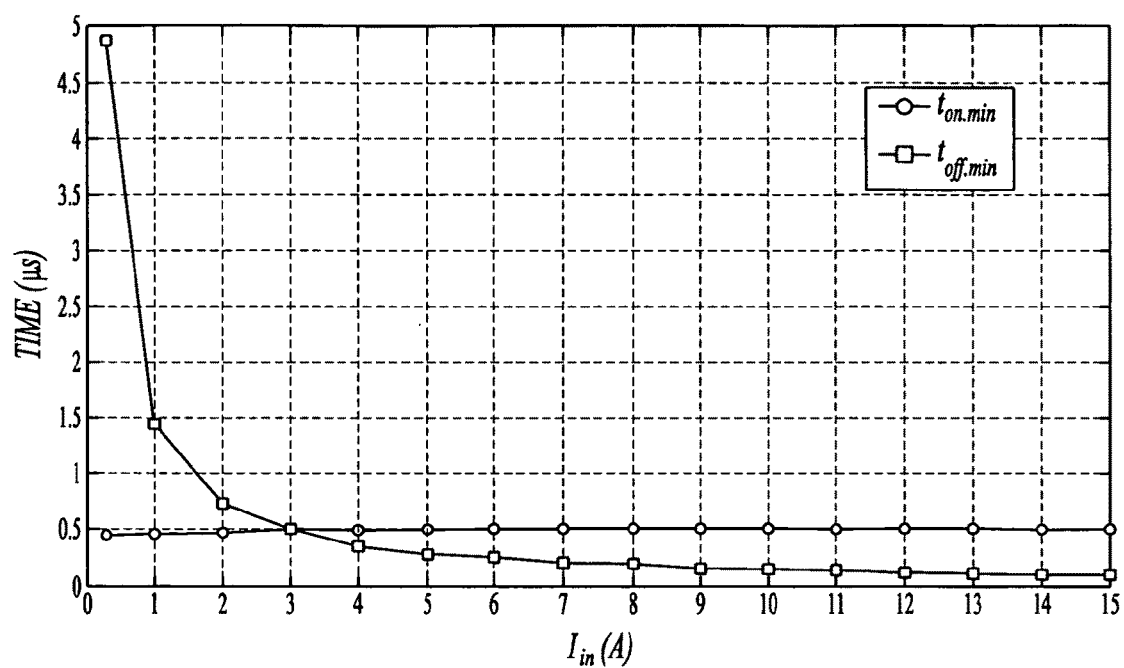
FIG. 31 shows the relationships of $t_{on,min}$ and $t_{off,min}$ versus $I_{in}$ for the boost converter of FIG. 28.

FIG. 31 shows the relationships of $t_{on,min}$ and $t_{off,min}$ versus $I_{in}$. The parameters used in the analysis are given in Table IV. The output voltage of the PFC is 380V. $t_{on,min}$ is fairly constant while $t_{off,min}$ increases as $I_{in}$ decreases.

The values of $t_{on,min}$ and $t_{off,min}$ of the MVS snubber discussed in the publication "Engineering design of lossless passive soft switching methods for PWM converters—Part I. With minimum voltage stress circuit cells," *IEEE Trans.*

Figure 32A:
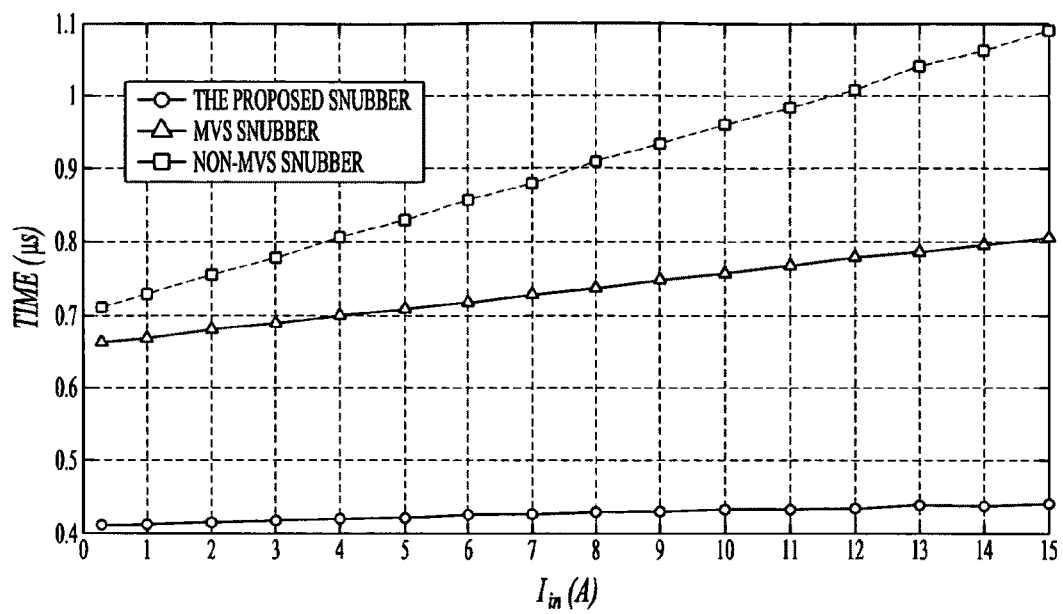
FIG. 32 shows a comparison of $t_{on,min}$ and $t_{off,min}$ versus $I_{in}$ of snubber cell used in the boost converter of FIG. 28 and a known MVS snubber cell and a known NMVS snubber cell.
Figure 32B:
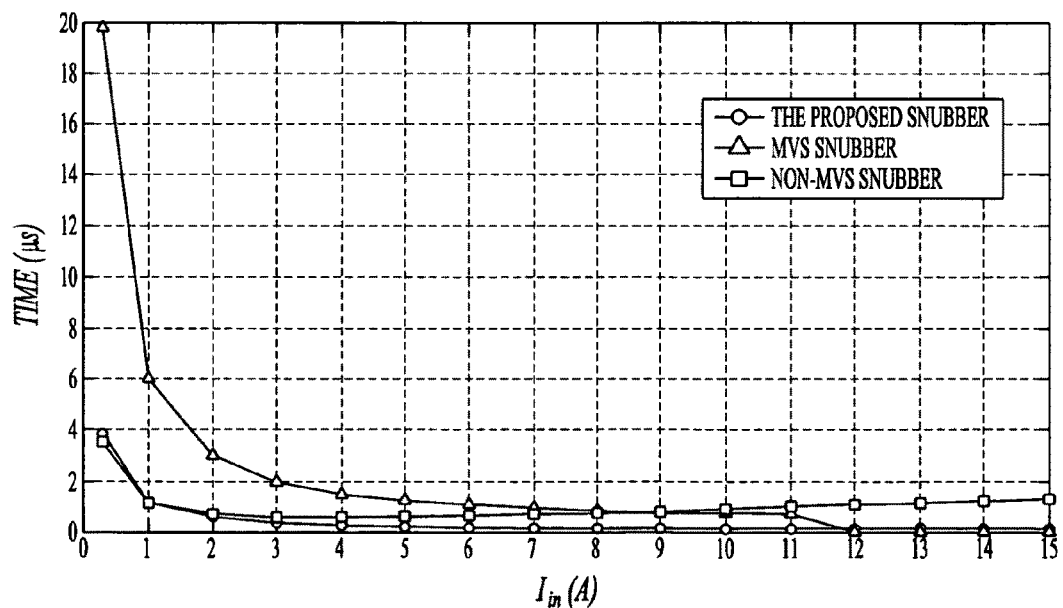

Power Electron., vol. 16, no. 3, pp. 336-344, May 2001, the NMVS snubber discussed in the publication "Engineering design of lossless passive soft switching methods for PWM converters—Part II. With non-minimum voltage stress circuit cells," IEEE Trans. Power Electron., vol. 17, no. 6, pp. 864-873, November 2002, and the snubber cell of FIG. 28 were compared as follows. The supply voltage was 90 Vrms-132 Vrms, 60 Hz, the rated output power was 750 W, and the output voltage was 250V. The component values of the proposed snubber are shown in Table V. FIG. 32 shows a comparison of $t_{on,min}$ and $t_{off,min}$ versus $I_{in}$ of the three snubbers. Table VI shows the minimum and maximum input current and duty cycle that can maintain soft-switching. With MVS, soft-switching is ensured for input current varying between 2.7 A and 11.9 A. With non-MVS, soft-switching is ensured for input current varying between 2.4 A and 12 A. With the snubber cell of FIG. 28, soft-switching is ensured for input current varying between 1.13 A and 14.14 A. Thus, the proposed snubber has a wider operating range than the known snubber cells.

The voltage and current stresses on the main switch with the three snubbers are also given in Table VI. By using (B10), the peak current $I_{pk}$ flowing through the main switch with the snubber cell of FIG. 28 is $$I_{pk} \approx I_{in} + V_{out}\sqrt{\frac{C_s}{L_{eq}(1+x)}} \tag{B63}$$

The non-MVS snubber gives wider soft-switching range than the MVS snubber at the expense of introducing extra voltage stress on the main switch. The snubber cell of FIG. 28 gives the same voltage stress of $V_{out}$ as the MVS snubber and lowest current stress on the main switch.

Finally, a very large value of the input inductor is undesired in the PFC converter design using the snubber cell of FIG. 28 because it will increase the overall physical size and conduction loss, perform slow dynamic response, reduce phase margin and increase parasitic capacitance. The value of the inductor is practically designed to give an input ripple current between 20% and 40% of the peak current at the low line and full-load conditions. Thus, the value of $I_{pk}$ in (B63) is designed to be less than a value, that is, the average input current plus the ripple current. Thus, no extra current stress will be imposed on the main switch.

In general, the invention provides a passive lossless snubber cell for a switched-mode power converter. The snubber cell comprises an energy absorbing circuit and an energy resetting circuit coupled to said energy absorbing circuit. The energy absorbing circuit is arranged to release energy stored in a snubber capacitor of the energy absorbing circuit to a storage capacitor of the energy resetting circuit through a resonant pathway of the snubber cell in response to a first switching action of a power converter transistor switch. The energy resetting circuit is arranged to release the energy stored therein to a part of a circuit of the power converter in response to a second switching action of the power converter transistor switch, the second switching action being a successive action to the first switching action. The passive lossless snubber cell has several advantages over existing snubbering techniques. First, it provides zero-current-switching (ZCS) and zero-voltage-switching (ZVS) conditions for turning on and off, respectively, the switch over a wide load range. Second, it does not introduce extra voltage stress on the switch. Third, by taking the ripple current through the switch into account, the peak switch current during the snubber resonance period is designed to be less than the designed switch current without the snubber. Hence, the proposed snubber does not introduce extra current stress on the switch.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

TABLE I

Value of $I_x$ and $V_x$ for different converters.

| Converter type | $I_x$ | $V_x$ |
|---|---|---|
| Buck | $I_L$ | $V_{in}$ |
| Boost | $I_L$ | $V_{out}$ |
| Buck-boost | $I_L$ | $V_{in} + V_{out}$ |
| Ćuk | $I_{L1} + I_{L2}$ | $V_{C1}$ |
| SEPIC | $I_{L1} + I_{L2}$ | $V_{C1} + V_{out}$ |
| 2-switch forward | $I_{pri,Tx}$ | $V_{in}$ |
| 2-switch flyback | $I_{pri,Tx}$ | $V_{in}$ |

TABLE II

Values of the components in the snubber cell for comparison.

| Item | Value | Item | Value |
|---|---|---|---|
| $C_s$ | 2.1 nF | $C_{st}$ | 2.47 nF |
| $L_s$ | 400 nH | $L_{st}$ | 10 μH |

TABLE III

Values of components in the snubber cell for the two-switch flyback.

| Item | Value | Item | Value |
|---|---|---|---|
| $C_s$ | 1.2 nF | $C_{st}$ | 4.8 nF |
| $L_s$* | 15 μH | $L_{st}$ | 22 μH |

*The leakage inductance of the flyback transformer is used as the snubber inductor.

TABLE IV

| Power stage | | Snubber circuit | |
|---|---|---|---|
| Item | Value | Item | Value |
| L | 290 μH | $C_s$ | 1.8 nF |
| C | 390 μF | $C_{st}$ | 2.2 nF |

TABLE IV-continued

| Power stage | | Snubber circuit | |
|---|---|---|---|
| Item | Value | Item | Value |
| $f_s$ | 100 kHz | $L_s$ | 1 μH |
| S | SPP20NM60N | $L_{st}$ | 30 μH |
| D | LQA08TC600 | $L_{sr}$ | 20 μH |

TABLE V

| Item | Value | Item | Value |
|---|---|---|---|
| $C_s$ | 2.2 nF | $C_{st}$ | 2.6 nF |
| $L_s$ | 500 nH | $L_{st}$ | 13 μH |
| $L_{sr}$ | 20 μH | | |

TABLE VI

| Snubber type | $I_{in,min}$ (A) | $I_{in,max}$ (A) | Designed $d_{min}$ | Allowable $d_{min}$ | $d_{max}$ | $v_{ds,max}$ (V) | $i_{ds,max}$ (A) |
|---|---|---|---|---|---|---|---|
| MVS | 2.7 | 11.9 | 0.25 | 0.077 | 0.75 | $V_{out}$ | $I_{pk}$ + 17.4 A |
| Non-MVS | 2.4 | 12 | 0.25 | 0.1 | 0.9 | $V_{out}$ + 80 | $I_{pk}$ + 8.43 A |
| Proposed | 1.13 | 14.14 | 0.25 | 0.043 | 0.93 | $V_{out}$ | $I_{pk}$ + 2.35 A |

The invention claimed is:

1. A snubber cell for a switched-mode power converter, comprising:
   an energy absorbing circuit;
   an energy resetting circuit coupled to said energy absorbing circuit;
   wherein the energy absorbing circuit is arranged to release energy stored in a snubber capacitor of the energy absorbing circuit to a storage capacitor of the energy resetting circuit through a resonant pathway of the snubber cell in response to a first switching action of a power converter transistor switch and wherein the energy resetting circuit is arranged to release the energy stored therein to a part of a circuit of the power converter in response to a second switching action of the power converter transistor switch, said second switching action being successive to the first switching action.

2. The snubber cell of claim 1, wherein the energy resetting circuit is arranged to release the energy stored therein to a load of the power converter circuit.

3. The snubber cell of claim 1, wherein the storage capacitor of the energy absorbing circuit is arranged to have an energy storage capacity equal to or greater than the energy storage capacity of the snubber capacitor.

4. The snubber cell of claim 1, wherein the energy absorbing circuit is arranged to release energy stored in a snubber inductor to be stored in the snubber capacitor in response to said first switching action prior to the step of releasing said energy from the snubber capacitor to said storage capacitor.

5. The snubber cell of claim 4, wherein the energy resetting circuit is arranged to not commence discharging of the energy stored in the storage capacitor until the snubber inductor is completely discharged.

6. The snubber cell of claim 5, wherein the energy resetting circuit is arranged to not commence discharging of the energy stored in the storage capacitor until the snubber inductor is completely discharged by defining a minimum switch on time and a minimum switch off time for the power converter transistor switch.

7. The snubber cell of claim 4, wherein a saturable inductor is arranged in series with said snubber inductor to further delay a rise in current in the transistor switch.

8. The snubber cell of claim 1, wherein said energy absorbing circuit comprises a snubber inductor arranged in series with the transistor switch of the power converter, the snubber capacitor arranged in parallel with said transistor switch, and a first diode arranged between a node common to the snubber inductor and the transistor switch and a node of said snubber capacitor.

9. The snubber cell of claim 8, wherein said energy resetting circuit comprises a configuration of a second diode, a storage inductor, a third diode, the storage capacitor and a fourth diode, wherein the second and fourth diodes and the storage capacitor couple the energy resetting circuit to the energy absorbing circuit.

10. The snubber cell of claim 1, wherein the snubber cell has first, second and third nodes for connecting to a switched-mode power converter circuit, there being provided a snubber inductor between the first and third nodes, a first diode in series with the snubber capacitor between the third and second nodes, a second diode between the first node and a first common node located between the first diode and the snubber capacitor, the storage capacitor in series with a fourth diode between the first and second nodes, and a storage inductor in series with a third diode between said first common node and a second common node located between the storage capacitor and the fourth diode.

11. A switched-mode power converter having a snubber cell as claimed in any one of claims 1 to 10.

12. The switched-mode power converter of claim 11, wherein said power converter comprises one of: a buck converter, boost converter, a buck-boost converter, a Cuk converter, a SEPIC, a two-switch forward converter, and a two-switch flyback converter.

13. A method of operating a switched-mode power converter having an energy absorbing circuit and an energy resetting circuit coupled to said energy absorbing circuit, the method comprising:
   releasing energy stored in a snubber capacitor of the energy absorbing circuit to a storage capacitor of the energy resetting circuit through a resonant pathway of the snubber cell in response to a first switching action of a transistor switch of the power converter; and
   releasing the energy stored in the storage capacitor to a part of a circuit of the power converter in response to a second switching action of the power converter transistor switch, said second switching action being successive to the first switching action.

14. The method of claim 13, wherein it comprises not commencing discharging of the energy stored in the storage capacitor until a snubber inductor is completely discharged.

15. The method of claim 14, wherein it comprises not commencing discharging of the energy stored in the storage capacitor until the snubber inductor is completely discharged by maintaining the transistor switch on for a defined minimum switch on time and maintaining the switch off for a defined minimum switch off time.

16. The method of claim 14, wherein it comprises providing a saturable inductor in series with said snubber inductor to further delay a rise in current in the transistor switch.

* * * * *